US007022937B2

(12) United States Patent
Okumura et al.

(10) Patent No.: US 7,022,937 B2
(45) Date of Patent: Apr. 4, 2006

(54) PLASMA PROCESSING METHOD AND APPARATUS FOR PERFORMING UNIFORM PLASMA PROCESSING ON A LINEAR PORTION OF AN OBJECT

(75) Inventors: Tomohiro Okumura, Kadoma (JP); Mitsuo Saitoh, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/747,059

(22) Filed: Dec. 30, 2003

(65) Prior Publication Data

US 2005/0040145 A1 Feb. 24, 2005

(30) Foreign Application Priority Data

Jan. 6, 2003 (JP) ............................ 2003-000256
Jan. 27, 2003 (JP) ............................ 2003-017376
May 28, 2003 (JP) ............................ 2003-150671

(51) Int. Cl.
*B23K 9/00* (2006.01)

(52) U.S. Cl. ............................ 219/121.56; 219/121.54

(58) Field of Classification Search ........... 219/121.36, 219/121.39, 121.4, 121.41, 121.42, 121.43, 219/121.44, 121.54, 121.55, 121.56, 121.58, 219/121.59; 118/723 ME, 718; 315/111.21; 427/122, 577; 378/119, 122
See application file for complete search history.

(56) References Cited

U.S. PATENT DOCUMENTS 4,771,447 A * 9/1988 Saitoh et al. ............... 378/119
5,260,106 A * 11/1993 Kawarada et al. .......... 427/577
5,539,176 A * 7/1996 Ikegaya et al. ........ 219/121.59
5,980,767 A * 11/1999 Koshimizu et al. ............ 438/9
6,197,151 B1 * 3/2001 Kaji et al. ............. 156/345.46
6,293,222 B1 * 9/2001 Paquet ................ 118/723 ME
6,670,766 B1 * 12/2003 Yamazaki et al. ...... 315/111.21
2004/0075396 A1 4/2004 Okumura et al.

FOREIGN PATENT DOCUMENTS

JP 9-49083 2/1997

* cited by examiner

*Primary Examiner*—Tu Hoang
(74) *Attorney, Agent, or Firm*—Wenderoth, Lind & Ponack, L.L.P.

(57) ABSTRACT

A plasma processing method is used to process a linear portion of an object to be processed by generating a linear plasma by supplying an electric power to an electrode provided at a plasma source or the object to be processed while supplying gas to the plasma source arranged in the neighborhood of the object to be processed and making activated particles generated by the plasma act on the object to be processed. The method includes detecting an inclination of the plasma source along a direction of an x-axis when the x-axis is taken in a linear direction of the linear portion of the object to be processed, and processing the linear portion of the object to be processed by the generated linear plasma by moving the plasma source along the x-axis direction while maintaining relative positions of the plasma source and the object to be processed so that the detected inclination of the plasma source becomes approximately zero.

23 Claims, 20 Drawing Sheets

Fig. 14
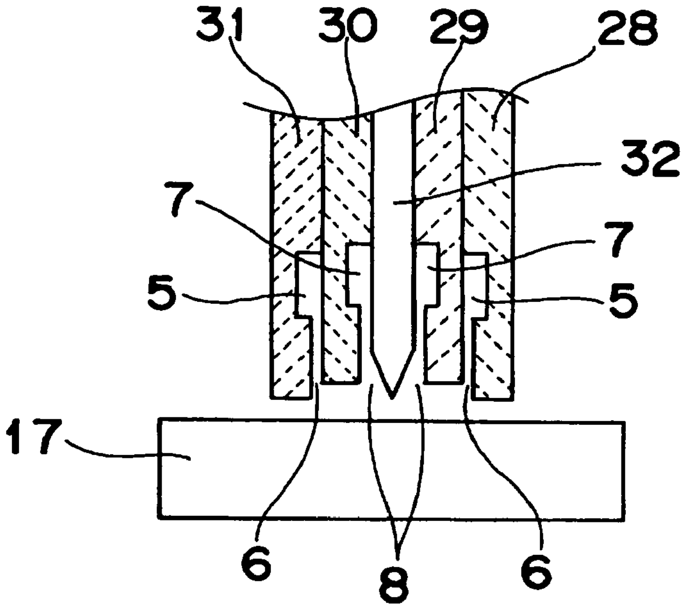
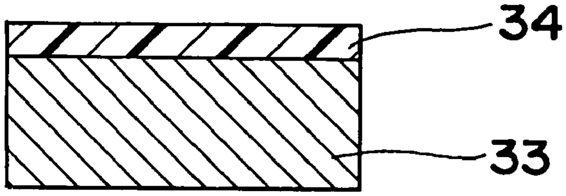
Fig. 15A
(PRIOR ART)
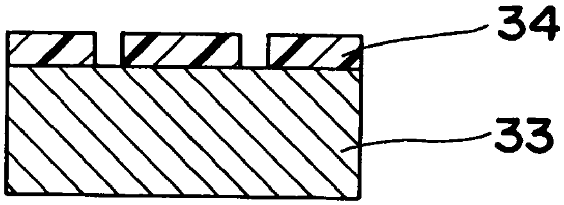
Fig. 15B
(PRIOR ART)
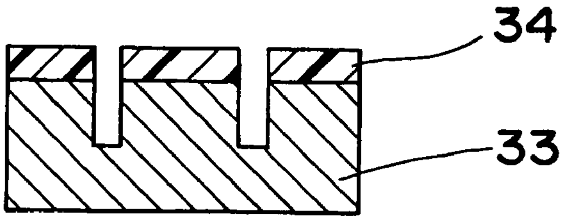
Fig. 15C
(PRIOR ART)
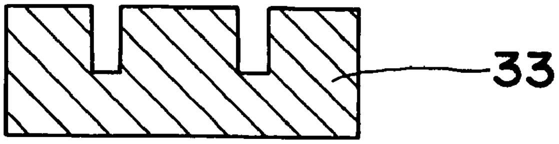
Fig. 15D
(PRIOR ART)

PLASMA PROCESSING METHOD AND APPARATUS FOR PERFORMING UNIFORM PLASMA PROCESSING ON A LINEAR PORTION OF AN OBJECT

BACKGROUND OF THE INVENTION

The present invention relates to a plasma processing method and apparatus for carrying out plasma processing on a portion of a surface of an object to be processed, and in particular, to a plasma processing method and apparatus for carrying out plasma processing for processing a linear portion on an object to be processed.

In general, when an object to be processed represented by a substrate on the surface of which a thin film is formed is subjected to a patterning process, a resist process is used. One example of the process is shown in FIGS. 15A through 15D. In FIGS. 15A through 15D, first of all, a photosensitive resist 34 is coated on the surface of an object 33 to be processed (FIG. 15A). Next, by carrying out exposure by means of an exposure apparatus and thereafter carrying out development, the resist 34 can be patterned into the desired shape (FIG. 15B). Then, by placing the object 33 in a vacuum vessel, generating a plasma in the vacuum vessel and subjecting the object 33 to an etching process using the resist 34 as a mask; the surface of the object 33 is patterned into the desired shape (FIG. 15C). Finally, by removing the resist 34 by means of an oxygen plasma, an organic solvent, or the like, the processing is completed (FIG. 15D).

The aforementioned resist process, which has been suitable for accurately forming a minute pattern, has come to play an important role in manufacturing electronic devices such as semiconductors. However, there is a drawback that the process is complicated.

Accordingly, there is examined a new processing method that uses no resist process. As one example, there is being proposed a plasma processing apparatus equipped with a microplasma source 99 as shown in FIG. 16A. With regard to the construction described as above, for example, a system for flowing gas in a linear direction is described in U.S. patent application Ser. No. 10/365,449 that has not yet been laid open.

Moreover, a system for applying an electric field across two electrodes is described in Unexamined Japanese Patent Publication No. 09-49083.

However, in the above-mentioned plasma processing apparatus, there is an issue that a processing speed is largely varied in two arbitrary portions in the linear direction (the uniformity of processing is poor) when a distance between the plasma source and the object to be processed is not uniform in the linear direction. For example, there is an issue that, when a plasma source 99 is inclined along the linear direction with respect to a thin plate 97 that is the object to be processed as shown in FIGS. 16A and 16B, a plasma 91 is concentrated on a portion where the distance between the plasma source 99 and the object 97 to be processed is small, failing in achieving plasma processing uniform in the linear direction.

SUMMARY OF THE INVENTION

Accordingly, in view of the aforementioned conventional issues, the present invention has the object of providing a plasma processing method and apparatus capable of achieving processing uniform in the linear direction and a plasma processing method capable of accurately controlling the processing speed.

In accomplishing the aforementioned object, the present invention is constructed as follows.

As is apparent from the above description, according to the plasma processing method of a first aspect of the present invention, there is provided a plasma processing method for processing a linear portion of an object to be processed by generating a linear plasma by supplying an electric power to an electrode provided at a plasma source or the object while supplying gas to the plasma source arranged in neighborhood of the object and making activated particles generated by the plasma act on the object, the method comprising:

detecting an inclination of the plasma source along a direction of an x-axis when the x-axis is taken in a linear direction of the linear portion of the object; and processing the linear portion of the object by the generated linear plasma by moving the plasma source along the x-axis direction while maintaining relative positions of the plasma source and the object so that the detected inclination of the plasma source becomes approximately zero. Therefore, processing uniform in the linear direction can be achieved.

Moreover, according to the plasma processing method of a second aspect of the present invention, there is provided the plasma processing method as defined in the first aspect, wherein when the linear portion of the object is processed, a distance between the plasma source and the object in two different x-coordinate positions is measured in order to detect the inclination of the plasma source along the x-axis direction, and the plasma processing is carried out by moving the plasma source along the x-axis direction while maintaining the relative positions of the plasma source and the object so that the distance between the plasma source and the object in the two positions becomes almost equalized. Therefore, processing uniform in the linear direction can be achieved.

Moreover, according to the plasma processing method of a third aspect of the present invention, there is provided the plasma processing method as defined in the first aspect, wherein the plasma processing is carried out by maintaining the relative positions of the plasma source and the object so that light emission intensities of the plasma in the two positions become almost equalized while monitoring light emission intensities of the plasma in the two different x-coordinate positions in order to detect the inclination of the plasma source along the x-axis direction. Therefore, processing uniform in the linear direction can be achieved.

Moreover, according to the plasma processing apparatus of a fifth aspect of the present invention, there is provided a plasma processing apparatus comprising:

a plasma source that is provided with an electrode, for generating a linear plasma;

a gas supply unit for supplying gas to the plasma source;

a power supply for supplying an electric power to the electrode or an object to be processed;

a detection unit for detecting an inclination of the plasma source along a direction of an x-axis when the x-axis is taken in a linear direction of a linear portion of the object; and a transport unit for moving the plasma source along the x-axis direction while maintaining relative positions of the plasma source and the object so that the inclination of the plasma source detected by the detection unit becomes almost zero, whereby the linear portion of the object is processed by the generated linear plasma while moving the plasma source along the x-axis direction by the transport unit. Therefore, processing uniform in the linear direction can be achieved.

Moreover, according to the plasma processing apparatus of a sixth aspect of the present invention, there is provided the plasma processing apparatus as defined in the fifth aspect, wherein the detection unit is a length measuring unit for measuring a distance between the plasma source and the object in two different x-coordinate positions, and the plasma source is moved along the x-axis direction by the transport unit by maintaining the relative positions of the plasma source and the object so that the distance between the plasma source and the object in the two different x-coordinate positions measured by the length measuring unit becomes almost equalized. Therefore, processing uniform in the linear direction can be achieved.

Moreover, according to the plasma processing apparatus of an eighth aspect of the present invention, there is provided the plasma processing apparatus as defined in the fifth aspect, wherein the detection unit is comprised of two light emission monitors for monitoring light emission intensities of the plasma in the two different x-coordinate positions. Therefore, processing uniform in the linear direction can be achieved.

Moreover, according to the plasma processing method of a tenth aspect of the present invention, there is provided a plasma processing method comprising:

carrying out plasma processing for processing a surface of an object to be processed for a test by generating a linear plasma by supplying an electric power to an electrode provided at a plasma source or the object for a test while supplying gas to the plasma source arranged in neighborhood of the object for a test with their relative positions fixed and making activated particles generated by the plasma act on the object for a test;

measuring a processing speed in a processed portion on the surface of the object for a test;

carrying out calibration of a length measuring unit for measuring a distance between the plasma source and an object to be processed, which is different from the object for a test and to be subjected to plasma processing, on the basis of a measurement result of the measuring; and carrying out plasma processing for processing a surface of the object to be subjected to the plasma processing by generating a linear plasma by supplying an electric power to the electrode provided at the plasma source or the object to be subjected to the plasma processing while supplying gas to the plasma source arranged in neighborhood of the object to be subjected to the plasma processing and measuring the distance between the plasma source and the object to be subjected to the plasma processing and making activated particles generated by the linear plasma act on the object to be subjected to the plasma processing. Therefore, the processing speed can be accurately controlled.

Moreover, according to the plasma processing method of an eleventh aspect of the present invention, there is provided a plasma processing method comprising:

processing a linear portion of an object to be processed for a test by generating a linear plasma by supplying an electric power to an electrode provided at a plasma source or an object to be processed for a test while supplying gas to the plasma source arranged in neighborhood of the object for a test with their relative positions fixed and making activated particles generated by the plasma act on the object for a test;

measuring a distribution in a linear direction of a processing speed in the processed linear portion of the object for a test;

carrying out calibration of a length measuring unit for measuring a distance between the plasma source and an object to be processed, which is different from the object for a test and to be subjected to plasma processing, in two different x-coordinate positions on the basis of a measurement result of the measuring when an x-axis is taken in the linear direction; and carrying out plasma processing for processing the object to be subjected to the plasma processing by generating a linear plasma by supplying an electric power to the electrode provided at the plasma source or the object to be subjected to the plasma processing while supplying gas to the plasma source arranged in neighborhood of the object to be subjected to the plasma processing and measuring the distance between the plasma source and the object to be subjected to the plasma processing in the two different x-coordinate positions and making activated particles generated by the linear plasma act on the object to be subjected to the plasma processing. Therefore, the processing speed can be accurately controlled.

Moreover, according to the plasma processing method of a twelfth aspect of the present invention, there is provided a plasma processing method comprising:

processing an object to be processed for a test by generating a linear plasma by supplying an electric power to an electrode provided at the plasma source or the object for a test while supplying gas to the plasma source arranged in neighborhood of the object for a test with their relative positions fixed and monitoring a light emission intensity of the plasma and making activated particles generated by the plasma act on the object for a test;

carrying out calibration of a length measuring unit for measuring a distance between the plasma source and an object to be processed, which is different from the object for a test and to be subjected to plasma processing, on the basis of a result of monitoring the light emission intensity in the object processing; and carrying out plasma processing for processing the object to be subjected to the plasma processing by generating a linear plasma by supplying an electric power to the electrode provided at the plasma source or the object to be subjected to the plasma processing while supplying gas to the plasma source arranged in neighborhood of the object to be subjected to the plasma processing and measuring the distance between the plasma source and the object to be subjected to the plasma processing and making activated particles generated by the linear plasma act on the object to be subjected to the plasma processing. Therefore, the processing speed can be accurately controlled.

Moreover, according to the plasma processing method of a thirteenth aspect of the present invention, there is provided a plasma processing method comprising:

processing a linear portion of an object to be processed for a test by generating a linear plasma by supplying an electric power to an electrode provided at a plasma source or the object for a test while supplying gas to the plasma source arranged in neighborhood of the object for a test with their relative positions fixed and monitoring light emission intensities of the plasma in two different x-coordinate positions when an x-axis is taken in a linear direction and making activated particles generated by the plasma act on the object for a test;

carrying out calibration of a length measuring unit for measuring a distance between the plasma source located in the two different x-coordinate positions and an object to be processed, which is different from the object for a test and to be subjected to plasma processing, on the basis of a result of monitoring the light emission intensities in the processing; and carrying out plasma processing for processing the object to be subjected to the plasma processing by generating a linear plasma by supplying an electric power to the electrode provided at the plasma source or the object to be subjected to the plasma processing while supplying gas to the plasma source arranged in neighborhood of the object to be subjected to the plasma processing and measuring the distance between the plasma source located in the two different x-coordinate positions and the object to be subjected to the plasma processing and making activated particles generated by the linear plasma act on the object to be subjected to the plasma processing. Therefore, the processing speed can be accurately controlled.

Moreover, according to the plasma processing method of a fourteenth aspect of the present invention, there is provided a plasma processing method for processing a linear portion of an object to be processed by generating a linear plasma by supplying an electric power to an electrode provided at the plasma source or the object while supplying gas to the plasma source arranged in neighborhood of the object and moving the plasma source in a linear direction with a distance between the object and the plasma source maintained almost constant while making activated particles generated by the plasma act on the object, the method comprising processing the linear portion of the object by using a length measuring unit arranged in a position located apart from the plasma source in a direction in which the plasma source moves and moving the plasma source in the linear direction while maintaining the distance between the object and the plasma source almost constant on the basis of a result of measuring the distance between the plasma source and the object measured by the length measuring unit. Therefore, the processing speed can be accurately controlled.

Moreover, according to the plasma processing method of a fifteenth aspect of the present invention, there is provided a plasma processing method for processing a linear portion of an object to be processed by generating a linear plasma by supplying an electric power to an electrode provided at the plasma source or the object while supplying gas to the plasma source arranged in neighborhood of the object and moving the object in a linear direction with a distance between the object and the plasma source maintained almost constant while making activated particles generated by the plasma act on the object, the method comprising processing the linear portion of the object by using a length measuring unit arranged in a position located apart from the plasma source in a direction opposite to a direction in which the object is moved and moving the object in the linear direction while maintaining the distance between the object and the plasma source almost constant on the basis of a result of measuring the distance between the plasma source and the object by the length measuring unit. Therefore, the processing speed can be accurately controlled.

Moreover, according to the plasma processing method of a sixteenth aspect of the present invention, there is provided a plasma processing method for carrying out plasma processing for processing an object to be processed by generating a plasma by supplying an electric power to an electrode provided at a plasma source or the object while supplying gas to the plasma source arranged in neighborhood of the object and making activated particles generated by the plasma act on a portion of the object, the method comprising executing end point detection of the processing of the object by monitoring a light emission intensity of the plasma. Therefore, uniform processing can be achieved.

Moreover, according to the plasma processing method of a seventeenth aspect of the present invention, there is provided a plasma processing method for carrying out plasma processing for processing an object to be processed by generating a plasma by supplying an electric power to an electrode provided at a plasma source or the object while supplying gas to the plasma source arranged in neighborhood of the object and making activated particles generated by the plasma act on a portion of the object while changing relative positions of the plasma source and the object, the method comprising processing the object by feeding back a result of monitoring a light emission intensity of the plasma to a relative position change rate of the plasma source and the object. Therefore, uniform processing can be achieved.

Moreover, according to the plasma processing method of an eighteenth aspect of the present invention, there is provided a plasma processing method for processing an object to be processed by generating a plasma by supplying an electric power to an electrode provided at a plasma source or the object while supplying gas to the plasma source arranged in neighborhood of the object and making activated particles generated by the plasma act on a portion of the object, the method comprising executing end point detection of the processing by monitoring an electric power, a voltage, or a current supplied to the electrode or the object. Therefore, uniform processing can be achieved.

Moreover, according to the plasma processing method of a nineteenth aspect of the present invention, there is provided a plasma processing method for carrying out plasma processing for processing an object to be processed by generating a plasma by supplying an electric power to an electrode provided at a plasma source or the object while supplying gas to the plasma source arranged in neighborhood of the object and making activated particles generated by the plasma act on a portion of the object while changing relative positions of the plasma source and the object, the method comprising processing the object by feeding back a result of monitoring an electric power, a voltage, or a current supplied to the electrode or the object to a relative position change rate of the plasma source and the object. Therefore, uniform processing can be achieved.

Moreover, according to the plasma processing method of a twentieth aspect of the present invention, there is provided a plasma processing method for processing an object to be processed by generating a plasma by supplying a high-frequency power to an electrode provided at a plasma source or the object via a matching circuit while supplying gas to the plasma source arranged in neighborhood of the object and making activated particles generated by the plasma act on a portion of the object, the method comprising executing end point detection of the processing of the object by monitoring a value of a variable reactance element in the matching circuit. Therefore, uniform processing can be achieved.

Moreover, according to the plasma processing method of a twenty-first aspect of the present invention, there is provided a plasma processing method for processing an object to be processed by generating a plasma by supplying a high-frequency power to an electrode provided at a plasma source or the object via a matching circuit while supplying gas to the plasma source arranged in neighborhood of the object and making activated particles generated by the plasma act on a portion of the object while changing relative positions of the plasma source and the object, the method comprising processing the object by feeding back a result of monitoring a value of a variable reactance element in the matching circuit to a relative position change rate of the plasma source and the object. Therefore, uniform processing can be achieved.

Moreover, according to the plasma processing apparatus of a twenty-third aspect of the present invention, there is provided a plasma processing apparatus comprising:

a plasma source, which is provided with an electrode, for generating a plasma in a portion of a surface of an object to be processed;

a gas supply unit for supplying gas to the plasma source;

a power supply for supplying an electric power to the electrode or the object;

a light emission monitor for monitoring a light emission intensity of the plasma; and an end point detector for executing end point detection of the plasma processing on the basis of a result of monitoring the light emission intensity. Therefore, uniform processing can be achieved.

Moreover, according to the plasma processing apparatus of a twenty-fourth aspect of the present invention, there is provided a plasma processing apparatus comprising:

a plasma source, which is provided with an electrode, for generating a plasma on a portion of a surface of an object to be processed;

a gas supply unit for supplying gas to the plasma source;

a power supply for supplying an electric power to the electrode or the object;

a mechanism for changing relative positions of the plasma source and the object;

a light emission monitor for monitoring a light emission intensity of the plasma; and a mechanism for feeding back a result of monitoring the light emission intensity to a relative position change rate of the plasma source and the object. Therefore, uniform processing can be achieved.

Moreover, according to the plasma processing apparatus of a twenty-fifth aspect of the present invention, there is provided a plasma processing apparatus comprising:

a plasma source, which is provided with an electrode, for generating a plasma on a portion of a surface of an object to be processed;

a gas supply unit for supplying gas to the plasma source;

a power supply for supplying an electric power to the electrode or the object;

a monitor of an electric power, a voltage, or a current for monitoring an electric power, a voltage, or a current; and an end point detector for executing end point detection of the plasma processing on the basis of a result of monitoring the electric power, voltage, or current. Therefore, uniform processing can be achieved.

Moreover, according to the plasma processing apparatus of a twenty-sixth aspect of the present invention, there is provided a plasma processing apparatus comprising:

a plasma source, which is provided with an electrode, for generating a plasma on a portion of a surface of an object to be processed;

a gas supply unit for supplying gas to the plasma source;

a power supply for supplying an electric power to the electrode or the object;

a mechanism for changing relative positions of the plasma source and the object;

a monitor of an electric power, a voltage, or a current for monitoring an electric power, a voltage, or a current; and a mechanism for feeding back a result of monitoring the electric power, voltage, or current to a relative position change rate of the plasma source and the object. Therefore, uniform processing can be achieved.

Moreover, according to the plasma processing apparatus of a twenty-seventh aspect of the present invention, there is provided a plasma processing apparatus comprising:

a plasma source, which is provided with an electrode, for generating a plasma on a portion of a surface of an object to be processed;

a gas supply unit for supplying gas to the plasma source;

a power supply for supplying a high-frequency power to the electrode or the object via a matching circuit;

a mechanism for monitoring a value of a variable reactance element in the matching circuit; and an end point detector for executing end point detection of the plasma processing on the basis of a result of monitoring the value of the variable reactance element. Therefore, uniform processing can be achieved.

Moreover, according to the plasma processing apparatus of a twenty-eighth aspect of the present invention, there is provided a plasma processing apparatus comprising:

a plasma source, which is provided with an electrode, for generating a plasma on a portion of a surface of an object to be processed;

a gas supply unit for supplying gas to the plasma source;

a power supply for supplying a high-frequency power to the electrode or the object via a matching circuit;

a mechanism for changing relative positions of the plasma source and the object;

a mechanism for monitoring a value of a variable reactance element in the matching circuit; and a mechanism for feeding back a result of monitoring the value of the variable reactance element to a relative position change rate of the plasma source and the object. Therefore, uniform processing can be achieved.

BRIEF DESCRIPTION OF THE DRAWINGS

These and other aspects and features of the present invention will become clear from the following description taken in conjunction with the preferred embodiments thereof with reference to the accompanying drawings, in which:

FIG. 14 is a sectional view of the plasma processing apparatus employed in another embodiment of the present invention;

FIG. 15A is a sectional view showing a step of the resist process used in a prior art example;

FIG. 15B is a sectional view showing a step of the resist process used in the prior art example;

FIG. 15C is a sectional view showing a step of the resist process used in the prior art example;

FIG. 15D is a sectional view showing a step of the resist process used in the prior art example;

DETAILED DESCRIPTION OF THE PREFERRED EMBODIMENTS

Figure 1:
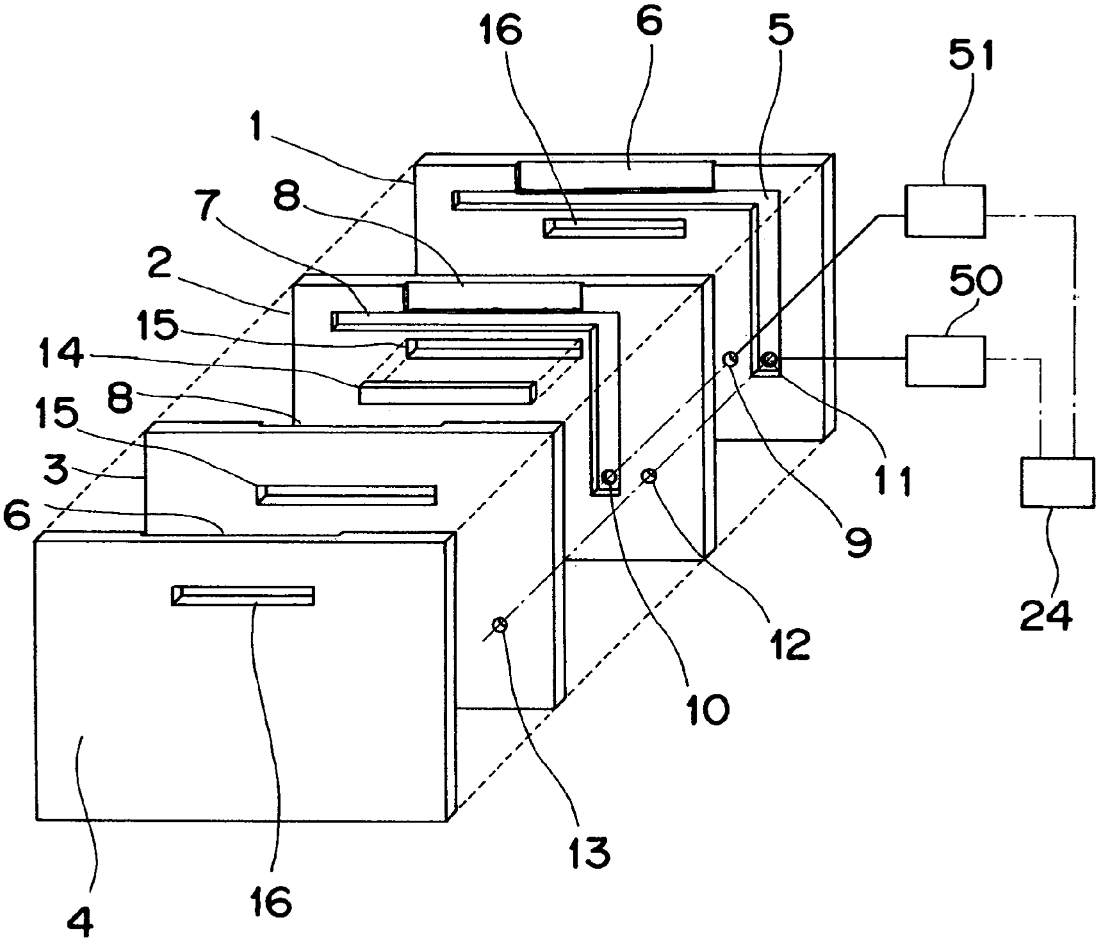
FIG. 1 is an exploded view of the plasma source employed in a first embodiment of the present invention.

Before the description of the present invention proceeds, it is to be noted that like parts are designated by like reference numerals throughout the accompanying drawings.

First Embodiment

The plasma processing method and apparatus of the first embodiment of the present invention will be described below with reference to FIGS. 1 through 4.

Figure 2:
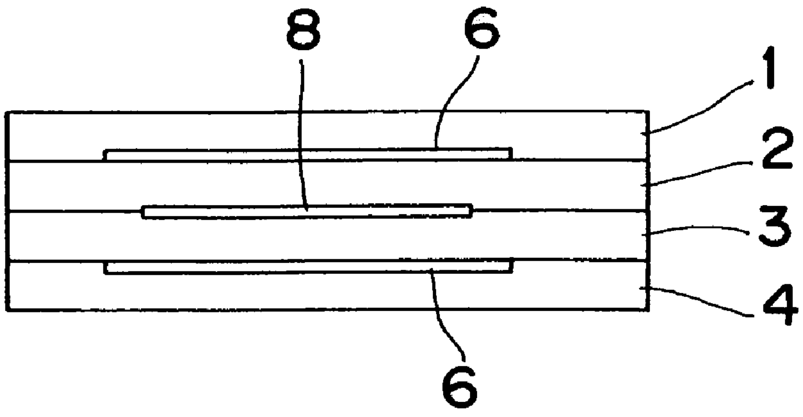
FIG. 2 is a plan view of the plasma source employed in the first embodiment of the present invention.
Figure 3:
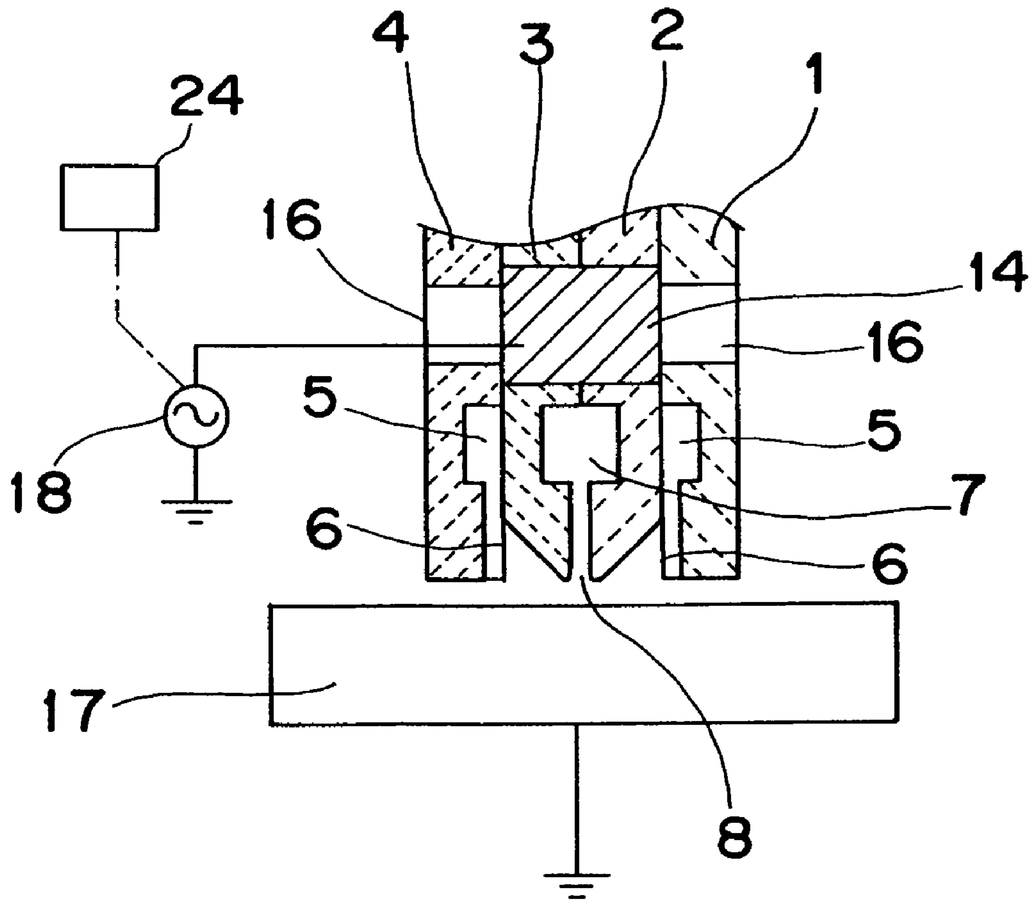
FIG. 3 is a sectional view of the plasma source employed in the first embodiment of the present invention.

FIG. 1 shows an exploded view of a microplasma source 19 elongated sideways in a to-be-formed linear direction of the plasma processing apparatus of the first embodiment. FIG. 2 shows a plan view of the microplasma source 19 viewed from the gas outlet side. FIG. 3 shows a cross section of a thin plate 17 as one example of the grounded object to be processed and the microplasma source, taken along a plane perpendicular to the thin plate 17. The microplasma source 19 is constructed of a rectangular outside plate 1, rectangular inside plates 2 and 3, and a rectangular outside plate 4, which are made of ceramics. The outside plates 1 and 4 are provided with an L-figured outside gas passage 5 and a rectangular outer gas outlet 6, respectively, while the inside plates 2 and 3 are provided with an L-figured inside gas passage 7 and a rectangular inner gas outlet 8, respectively. That is, the outside plate 1, the inside plates 2 and 3, and the outside plate 4 are provided, the outer gas outlets 6 are provided between the outside plate 1 and the inside plate 2 and between the inside plate 3 and the outside plate 4, and the inner gas outlet 8 is provided between the inside plates 2 and 3. The material gas of the gas issued from the inner gas outlet 8 is guided from an inside gas supply port 9, which is provided at the outside plate 1 and connected to an external inside gas supply unit 51, via a through hole 10 provided at the inside plate 2 to the inside gas passage 7 of the inside plate 2 and the inside gas passage 7 of the inside plate 3 opposed to the inside gas passage 7 of the inside plate 2.

Moreover, the material gas issued from the outer gas outlet 6 is guided from an outside gas supply port 11, which is provided at the outside plate 1 and connected to an external outside gas supply unit 50, to the outside gas passage 5 of the outside plate 1 while being guided to the outside gas passage 5 of the outside plate 4 via a through hole 12 provided at the inside plate 2 and a through hole 13 provided at the inside plate 3. The inside gas supply unit 51 and the outside gas supply unit 50 are operatively controlled by a control unit 24 described later.

A sideways elongated rectangular electrode 14 to which a high-frequency power is applied is inserted in a sideways elongated rectangular electrode fixation slot 15 provided at the inside plates 2 and 3, and wiring to a power supply 18 for high-frequency power supply and cooling provided and effected through sideways elongated rectangular through holes 16 is provided at the outside plates 1 and 4. The power supply 18 for high-frequency power supply is operatively controlled by the control unit 24 described later.

The inside plates 2 and 3 have their lowermost portions tapered to enable the plasma processing of a minute linear region. It is to be noted that a fine line formed of the inner gas outlet 8 as an opening of the microplasma source has a thickness of 0.1 mm.

In the plasma processing apparatus equipped with the microplasma source 19 of the aforementioned construction, by supplying the high-frequency power to the electrode 14 while supplying helium (He) from the inner gas outlet 8 and a sulfur hexafluoride ($SF_6$) from the outer gas outlet 6, a minute linear portion of the silicon thin plate 17 can be etched. The reason for the above is that a linear microplasma can be generated only in the neighborhood of the inner gas outlet 8 where a helium concentration becomes high taking advantage of a difference in readiness for electric discharge at a pressure around the atmospheric pressure between helium and sulfur hexafluoride (helium is more prone to electric discharge).

The microplasma source 19, which can operate from several Pascals to several atmospheric pressures, operates typically at a pressure within a range of about 10000 Pa to three atmospheric pressures. In particular, operation at and around the atmospheric pressure is especially preferable since neither strict sealed structure nor special exhaust device is necessary and the diffusion of plasmas and activated particles is moderately restrained.

Figure 4:
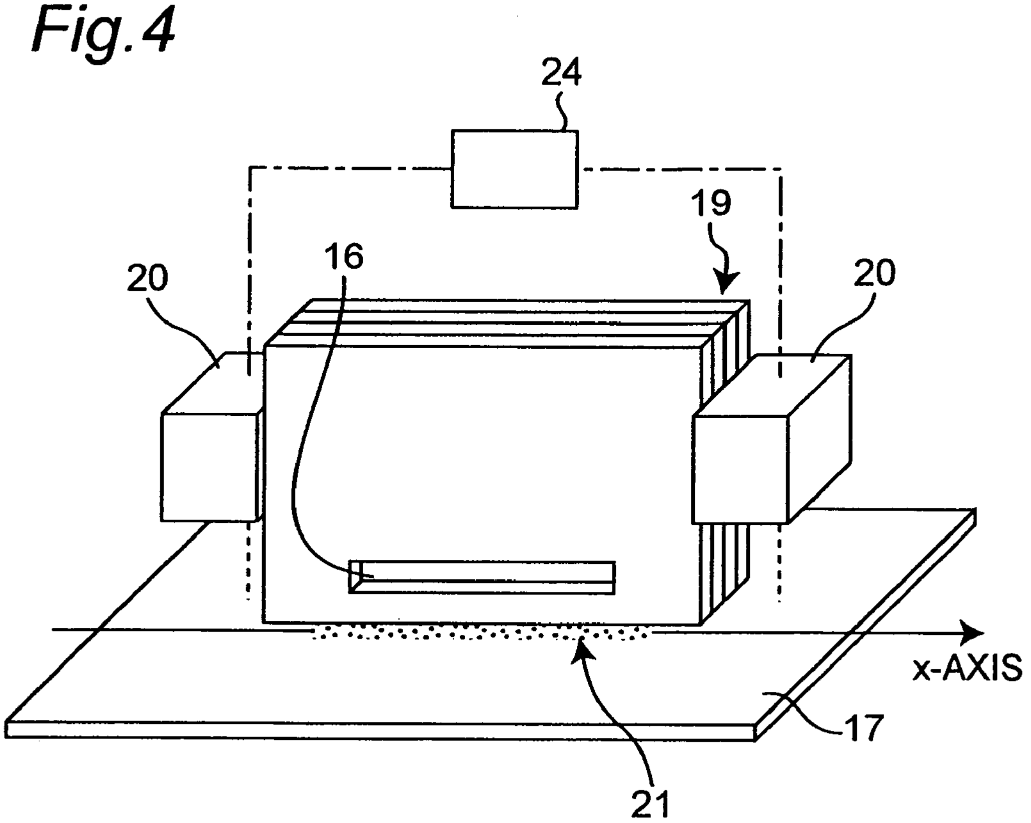
FIG. 4 is a perspective view of the plasma processing apparatus employed in the first embodiment of the present invention.

FIG. 4 is a perspective view showing the construction of the plasma processing apparatus employed in the first embodiment of the present invention. In FIG. 4, a thin plate 17 as one example of the object to be processed and a plasma source 19 are arranged oppositely to each other, and a minute linear plasma 21 is generated between the thin plate 17 and the plasma source 19, allowing a minute linear portion on the thin plate 17 to be processed by the plasma. Two laser length measuring units 20 are fixed to the plasma source 19 and constructed so that, by measuring distances between the laser length measuring units 20 and the thin plate 17 at two points (as one example, at the front end and the rear end in the direction in which the illustrated plasma source 19 moves), the distances between the plasma source 19 and the thin plate 17 can be measured at the two points. Preferably, measurement results of the laser length measuring units 20 are inputted to the control unit 24 described later so as to be made usable for the operational control of the plasma processing.

That is, when the x-axis is taken in the linear direction, the length measuring units 20 are constructed so as to be able to measure the distances between the plasma source 19 and the object to be processed in two different x-coordinate positions (as one example, the front end region and the rear end region in the direction in which the illustrated plasma source 19 moves) and to carry out plasma processing while maintaining the relative positions of the plasma source 19 and the object to be processed so that the distances between the plasma source 19 and the object to be processed in these two regions become almost equalized.

The above-mentioned plasma source 19 as described above, which can operate from several Pascals to several atmospheric pressures, operates typically at a pressure within a range of about 10000 Pa to three atmospheric pressures. In particular, operation at and around the atmospheric pressure is especially preferable since neither strict sealed structure nor special exhaust system is necessary and the diffusion of plasmas and activated particles is moderately restrained.

By carrying out the plasma processing in the plasma processing apparatus constructed as above, processing uniform in the linear direction was able to be achieved. Typically, the distance between the plasma source 19 and the object to be processed is 0.3 mm. When the distance between the plasma source 19 and the object to be processed was varied by 0.01 mm (10 μm) in the two different x-coordinate positions, uniformity in the linear direction was deteriorated from ±4.5% to ±11.0%. From this fact, it was discovered that a laser length measuring unit 20 having a capability of accurate measurement as a length measuring unit was suitable, and a variation in the distance between the plasma source 19 and the object to be processed was preferably required to be smaller than about 0.01 mm.

However, in order to reduce this variation down to less than 0.001 mm (1 μm), there are required very high accuracies as the mounting accuracy for determining the relative positions of the length measuring unit 20 and the plasma source 19 and the accuracy of the mechanism for adjusting the distance. Therefore, it is considered desirable that the variation in the distance between the plasma source 19 and the object to be processed falls within a range of 0.001 mm to 0.01 mm. Moreover, the laser length measuring units 20 additionally have an advantage that the length measurement can be achieved in a noncontact manner.

Second Embodiment

The plasma processing apparatus and a method therefor according to the second embodiment of the present invention will be described next with reference to FIG. 5.

Figure 5:
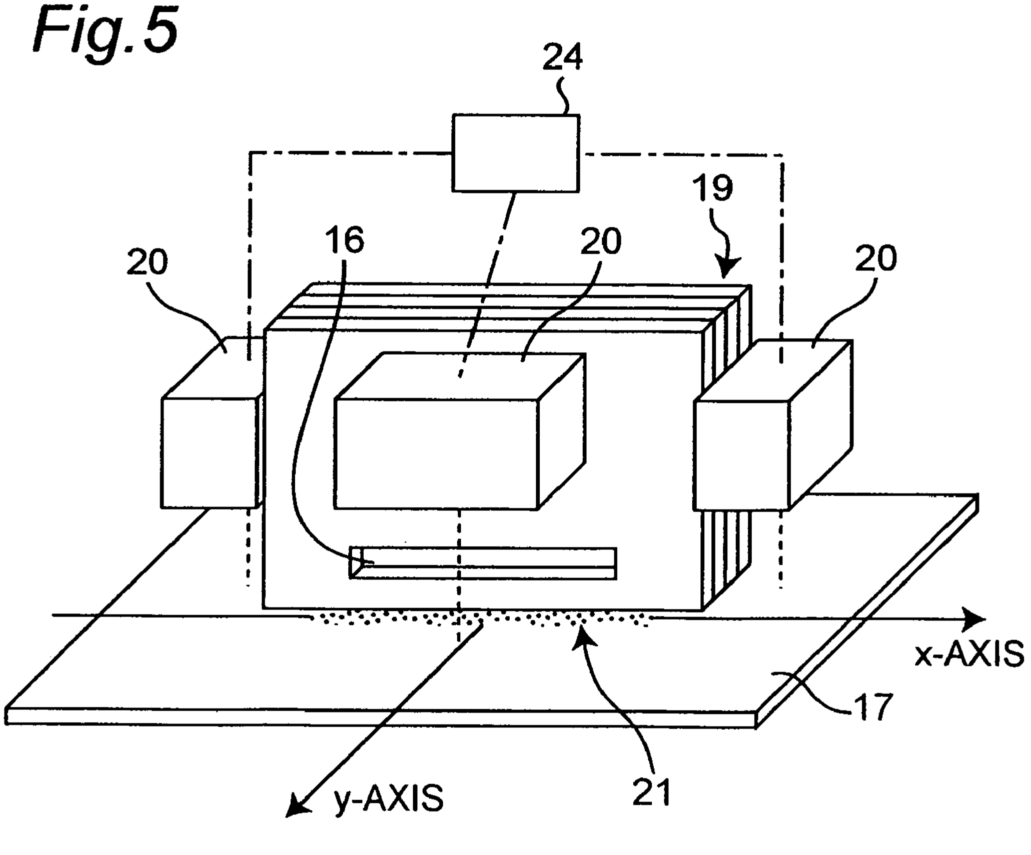
FIG. 5 is a perspective view of the plasma processing apparatus employed in a second embodiment of the present invention.

In FIG. 5, three laser length measuring units 20 are employed so that, when the x-axis is taken in the linear direction, distances between the plasma source 19 and the object to be processed in two different x-coordinate positions can be measured, and distances between the plasma source 19 and the object to be processed in two different y-coordinate positions in the y-axis direction perpendicular to the x-axis direction can be concurrently measured. The above arrangement also enables the control of reducing an inclination in the direction perpendicular to the linear direction, allowing the accuracy of the plasma processing to be further improved.

Third Embodiment

The plasma processing apparatus and a method therefor according to the third embodiment of the present invention will be described next with reference to FIG. 6.

Figure 6:
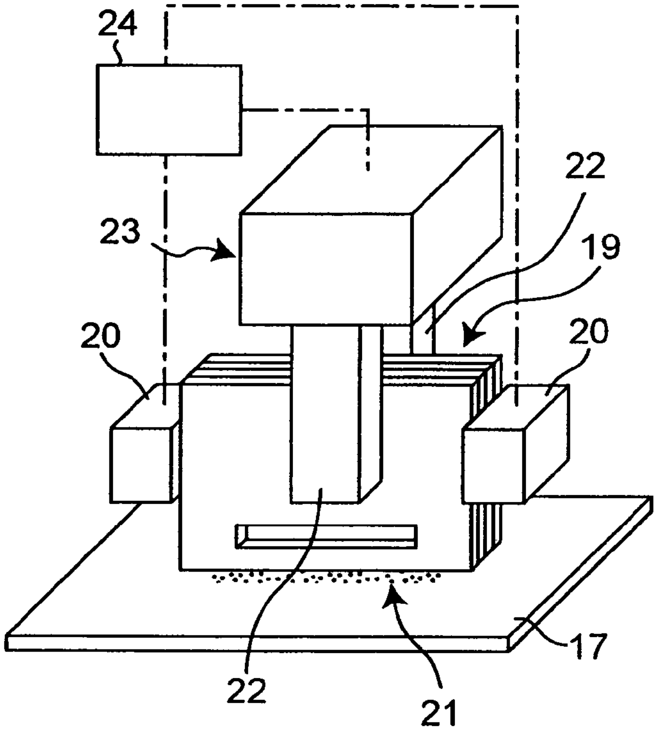
FIG. 6 is a perspective view of the plasma processing apparatus employed in a third embodiment of the present invention.

In FIG. 6, a pair of brackets 22 and 22 that hold the plasma source 19 therebetween are connected to an inclination control unit 23, and a control unit 24 is connected to two laser length measuring units 20 and the inclination control unit 23. On the basis of the measurement results from the two laser length measuring units 20, arithmetic operation is executed by the control unit 24 to make the inclination control unit 23 execute inclination control.

Figure 20:
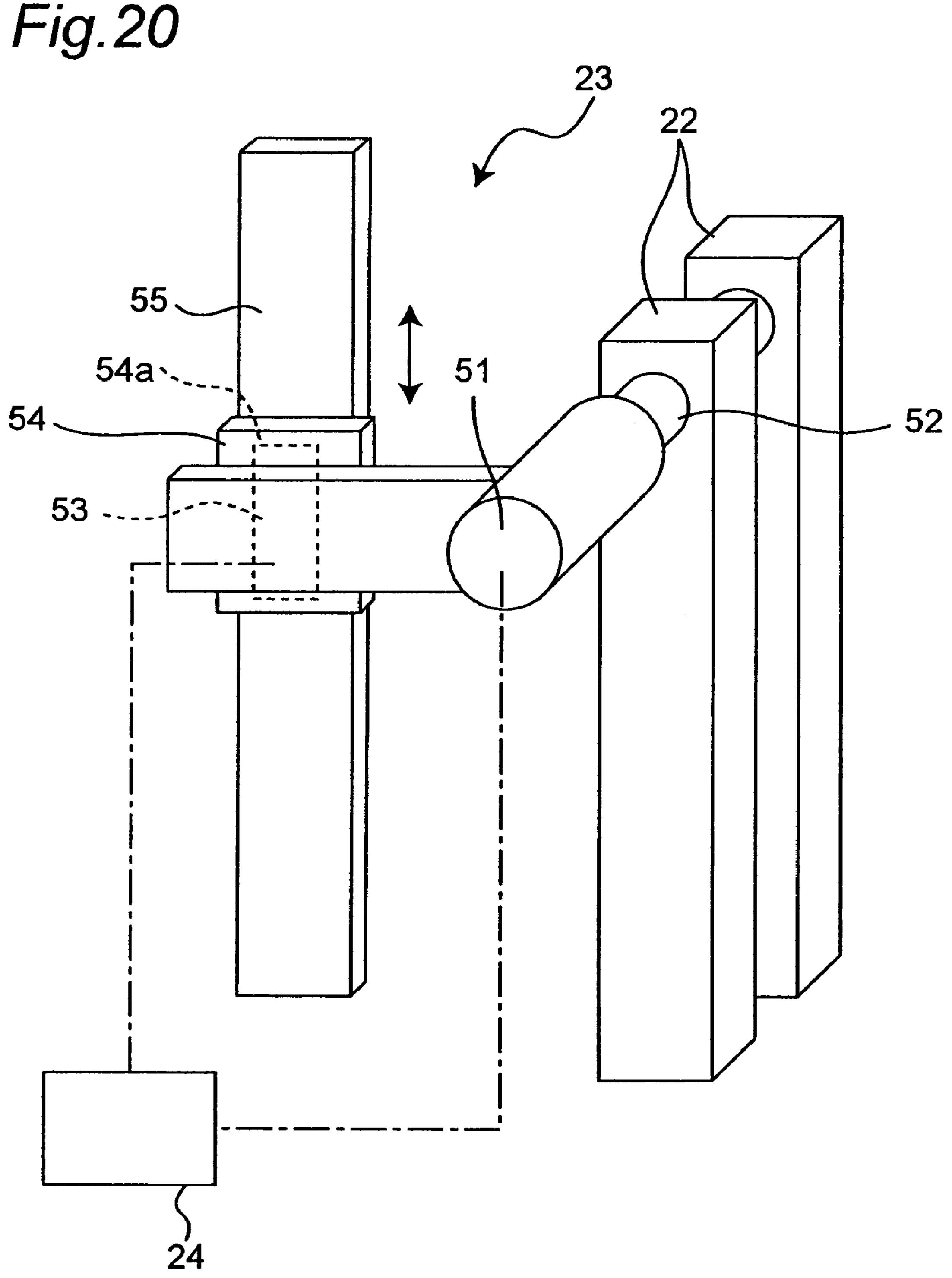
FIG. 20 is a perspective view of an inclination control unit portion of the plasma processing apparatus employed in the third embodiment of the present invention.

As shown in FIG. 20, the inclination control unit 23 is constructed of: an inclination control drive motor 51 as one example of an inclination control drive unit, which is operatively controlled by the control unit 24 and in which the pair of brackets 22 and 22 are fixed to a rotary shaft 52; a motor holder 53 to which the inclination control drive motor 51 is fixed; a rail 55 fixed vertically to the casing (not shown) of the inclination control unit 23; and a moving stage 54, to which the motor holder 53 is fixed and which moves up and down the motor holder 53 along the rail 55 to which a screw shaft engaged with an elevation drive motor 54*a* is fixed by forwardly and reversely rotating the motor 54*a* provided as one example of the elevation drive unit connected to the control unit 24. Therefore, by forwardly and reversely rotating the rotary shaft 52 of the inclination control drive motor 51 under the control of the control unit 24, the pair of brackets 22 and 22 are forwardly and reversely rotated integrally with the rotary shaft 52, allowing an inclination angle to be controlled, or in other words, adjusted. In concrete, the results of measuring the distances between the plasma source 19 and the object 17 to be processed in the two positions by the two laser length measuring units 20 are sent to the control unit 24, the difference between the distances between the plasma source 19 and the object 17 to be processed in the two positions is obtained by the control unit 24, and the inclination angle of the pair of brackets 22 and 22 for making the difference become almost zero is obtained by the control unit 24. By forwardly and reversely driving the rotation of the rotary shaft 52 of the inclination control drive motor 51 on the basis of the obtained inclination angle, a difference between the distances between the plasma source 19 and the object 17 to be processed in the two positions is made to become almost zero. Then, by measuring again the distances between the plasma source 19 and the object 17 to be processed in the two positions by the two laser length measuring units 20, sending the results of measurement to the control unit 24 and executing calculation by means of the control unit 24, the inclination control drive motor 51 is driven so as to make the difference between the distances between the plasma source 19 and the object 17 to be processed in the two positions become almost zero.

Figure 21:
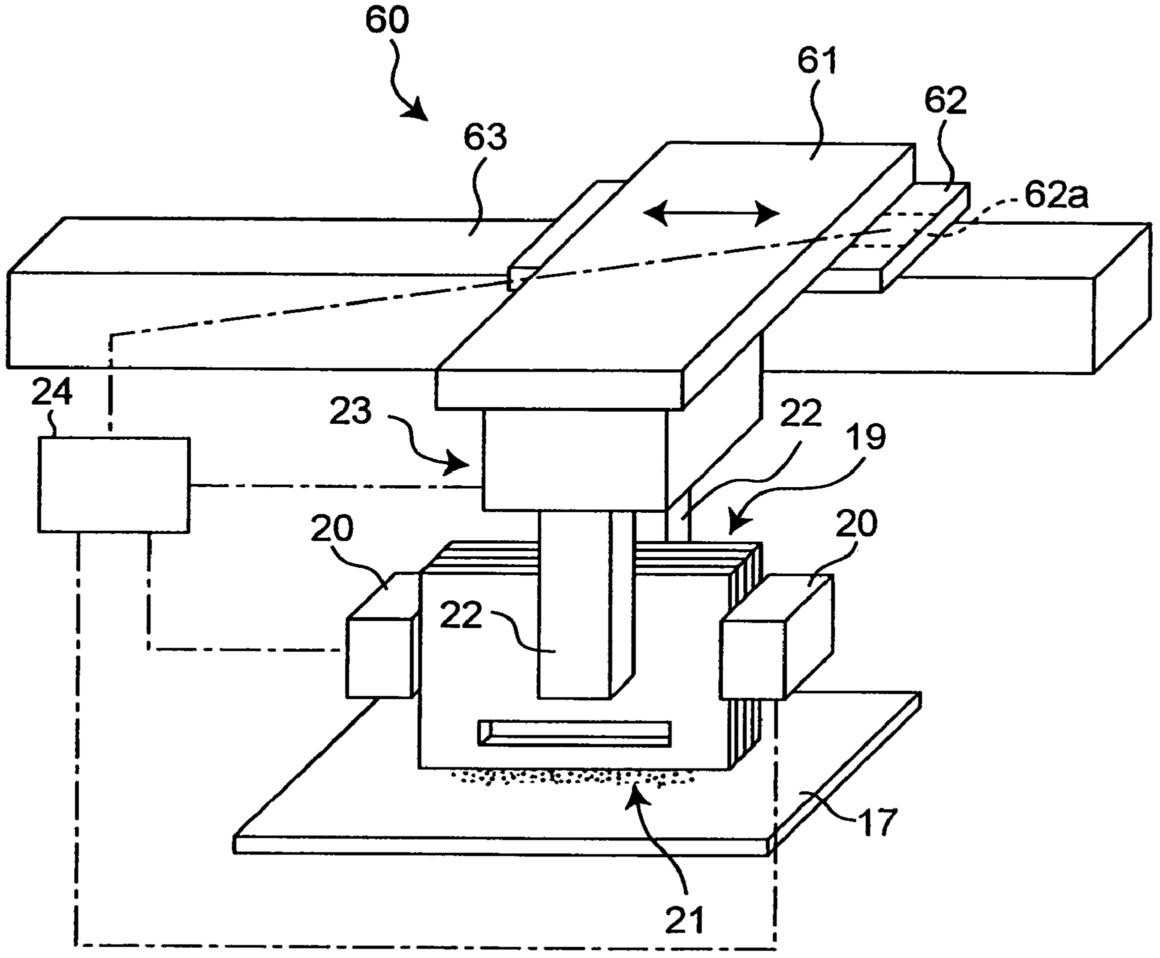
FIG. 21 is a perspective view showing the plasma processing apparatus employed in the third embodiment of the present invention together with a transport unit.

FIG. 21 shows one example of the transport unit 60 of the plasma processing apparatus. The transport unit 60 is constructed of a bracket 61 to which the inclination control unit 23 is fixed, a rail 63 extended along the direction of movement (the linear direction described later) of the transport unit 60, and a moving stage 62, to which the bracket 61 is fixed and which moves the bracket 61 along the rail 63 to which a screw shaft engaged with a transport drive motor 62*a* provided as one example of the transport drive unit is fixed by forwardly and reversely rotating the motor 62*a*. Therefore, the moving stage 62 advances along the rail 63 in accordance with the forward rotation of the transport drive motor 62*a* under the control of the control unit 24, allowing the plasma source 19 to move with respect to the object 17 to be processed via the bracket 61 and the inclination control unit 23.

As described above, the plasma processing can be carried out with the transporting operation of the transport unit 60 while executing the inclination control by means of the inclination control unit 23 under the control of the control unit 24.

Moreover, the inclination control unit 23 can control not only the inclination but also the distance between the plasma source 19 and the object 17 to be processed. That is, by driving the elevation drive motor 54*a* of the moving stage 54 under the control of the control unit 24, the moving stage 54 is moved up and down along the rail 55 to move up and down the plasma source 19 with respect to the object 17 to be processed via the motor holder 53, the inclination control drive motor 51, and the pair of brackets 22 and 22, and the distance between the plasma source 19 and the object 17 to be processed can be adjusted.

Moreover, according to the above-mentioned embodiment, it is possible to send a position control command to the inclination control unit 23 by feeding back the measurement result by means of the laser length measuring unit 20 to the control unit 24. That is, it is possible to send the results of measuring the distances between the plasma source 19 and the object 17 to be processed in the two positions to the control unit 24, obtain the inclination angle of the plasma source 19 with respect to the object 17 to be processed so that the distances between the plasma source 19 and the object 17 to be processed in the two positions becomes almost equalized by means of the control unit 24 and control the operation of the inclination control unit 23 so that the plasma source 19 is inclined at the obtained inclination angle. Therefore, the adjustment of the inclination angle of the plasma source 19 with respect to the object 17 to be processed can be automated.

Fourth Embodiment

The plasma processing apparatus and a method therefor according to the fourth embodiment of the present invention will be described next with reference to FIG. 7.

Figure 7:
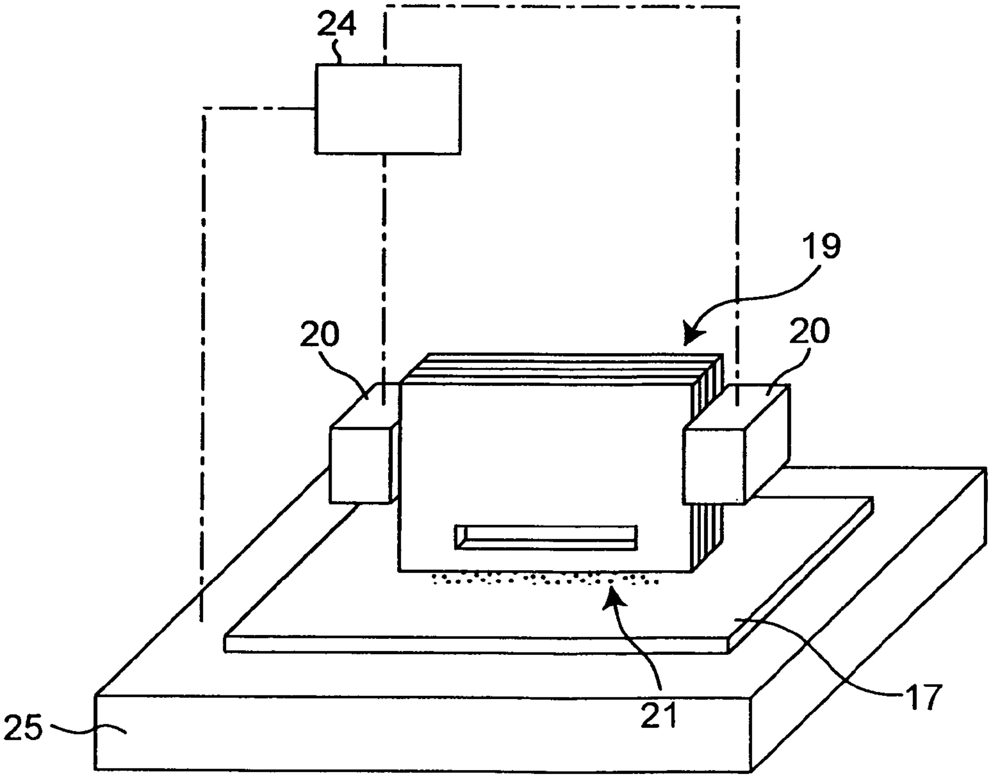
FIG. 7 is a perspective view of the plasma processing apparatus employed in a fourth embodiment of the present invention.

In FIG. 7, a sample holder 25 as one example of a processing object holding unit for holding the object 17 to be processed is provided, and the sample holder 25 has a built-in inclination control mechanism capable of controlling not only the inclination but also the distance between the plasma source 19 and the object 17 to be processed. Moreover, a position control command can be sent to the sample holder 25 by feeding back the measurement result by means of the laser length measuring units 20 to the control unit 24. That is, position control can be achieved by sending the measurement results of the distances between the plasma source 19 and the object 17 to be processed in the two positions by means of the laser length measuring units 20 to the control unit 24 and feeding back the results to the transport unit 60, which is the mechanism for moving the object 17 to be processed, by means of the control unit 24.

Fifth Embodiment

The plasma processing apparatus and a method therefor according to the fifth embodiment of the present invention will be described next with reference to FIG. 8.

Figure 8:
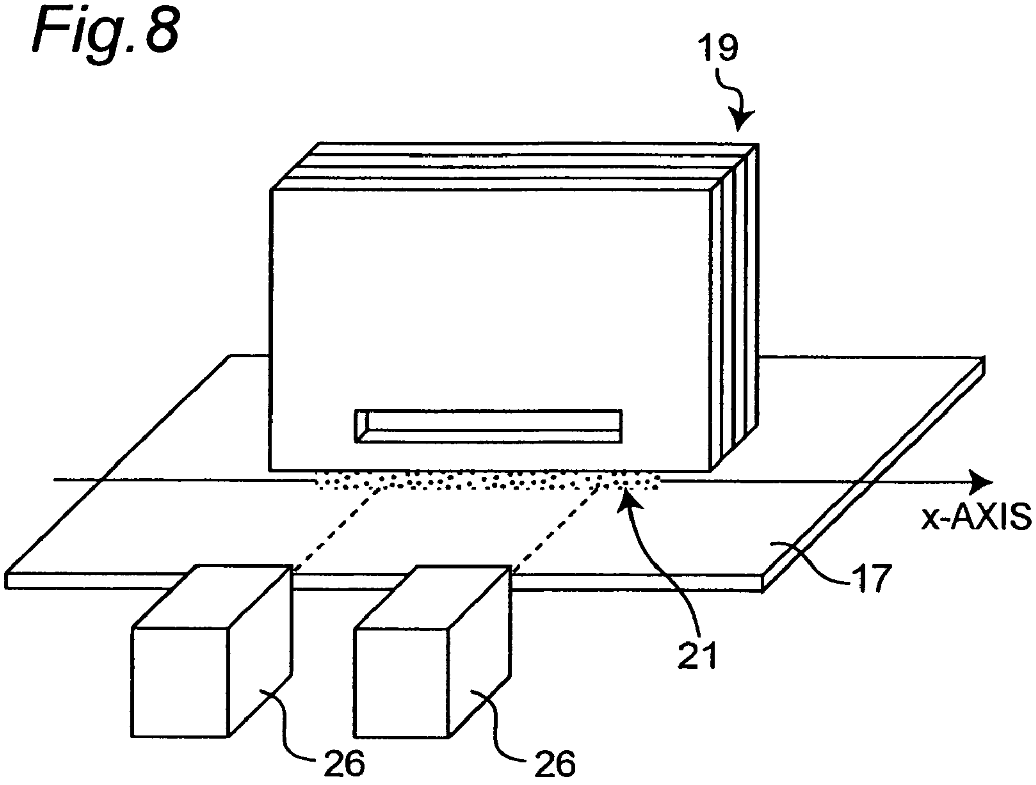
FIG. 8 is a perspective view of the plasma processing apparatus employed in a fifth embodiment of the present invention.

FIG. 8 is a perspective view showing the construction of the plasma processing apparatus employed in the fifth embodiment of the present invention. In FIG. 8, a thin plate 17 as one example of the object to be processed and a plasma source 19 are arranged oppositely to each other, and a minute linear plasma 21 is generated between the thin plate 17 and the plasma source 19, allowing a minute linear portion on the thin plate 17 to be processed by the plasma. In order to make it possible to observe the light emission from the linear plasma generated in a space between the plasma source 19 and the thin plate 17, two photodiodes 26 as one example of light emission monitors are provided in the sideways direction. The positions in which the light emission monitors are provided is preferably located in the vicinity of the front end and in the vicinity of the rear end of the inner gas outlet 8 along the direction of movement in improving the detection accuracy, as shown in FIGS. 8 and 22.

Figure 22:
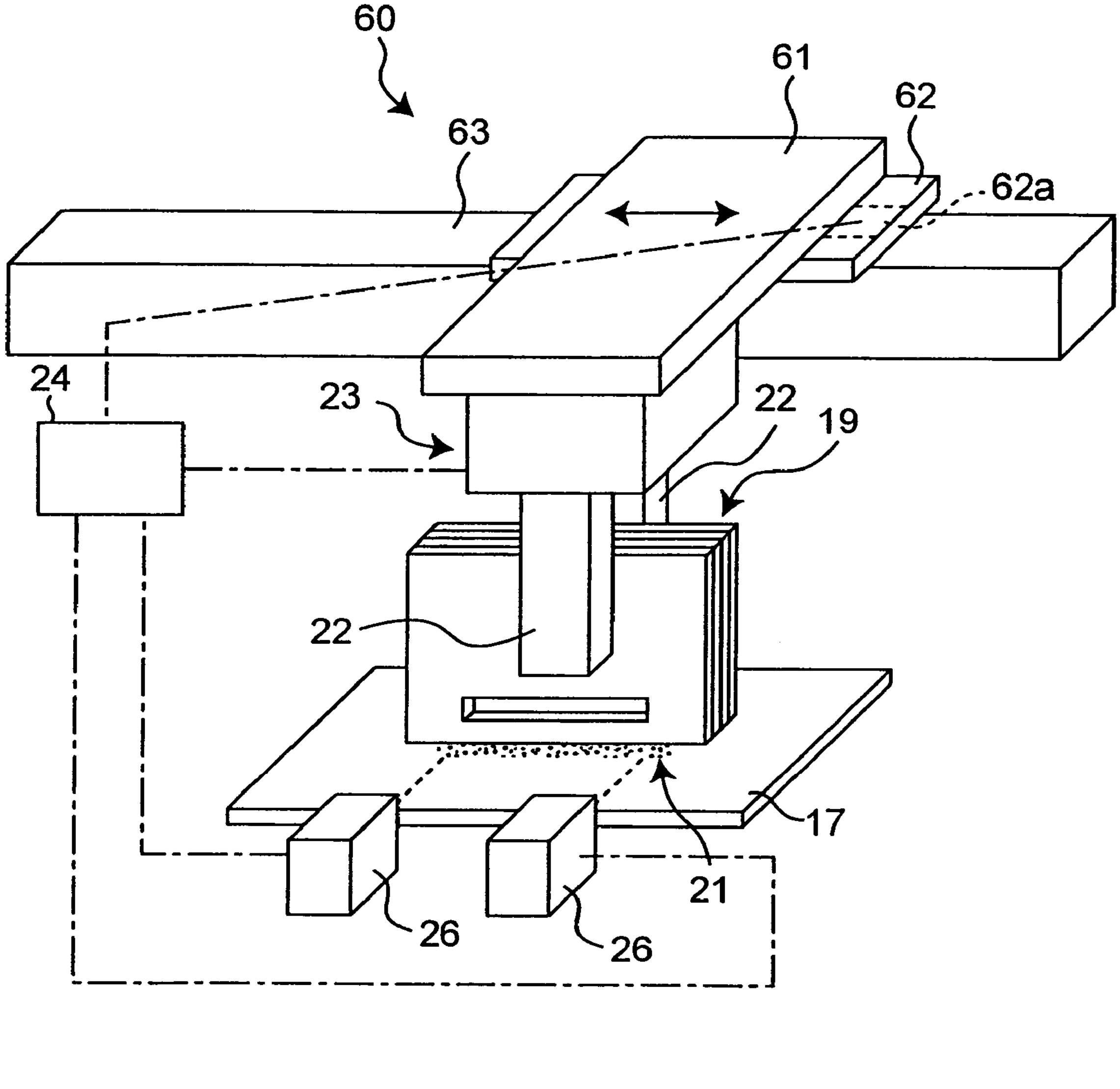
FIG. 22 is a perspective view showing the plasma processing apparatus employed in the fifth embodiment of the present invention together with a transport unit.

FIG. 22 shows a state in which the plasma processing apparatus employed in the fifth embodiment is provided with an inclination control unit 23 and a transport unit 60 and operatively controlled under the operational control of a control unit 24. Therefore, when the x-axis is taken in the linear direction, the light emission intensities of the plasma observed in two different x-coordinate positions can be monitored by the two photodiodes 26. It is possible to carry out plasma processing by sending the light emission intensities of the plasma observed by the two photodiodes 26 in these two positions to the control unit 24, comparing the light emission intensities by the control unit 24, and moving the plasma source 19 in the linear direction by the transport unit 60 while controlling the relative positions of the plasma source 19 and the object to be processed by adjusting the inclination angle of the plasma source 19 with respect to the object to be processed with the inclination control unit 23 operatively controlled so that the light emission intensities in the two positions become almost equalized.

By carrying out the plasma processing in the plasma processing apparatus constructed as above, the plasma processing uniform in the linear direction was able to be achieved. Typically, the distance between the plasma source 19 and the object to be processed was 0.3 mm. When the light emission intensities of plasma in the two different x-coordinate positions were varied by 10%, the plasma processing speed was also varied by roughly 10%. This clarified the fact that it was effective to carry out the plasma processing while maintaining the relative positions of the plasma source 19 and the object to be processed so that the light emission intensities of plasma in the two positions become almost equalized. Moreover, the photodiode also has an advantage that it is inexpensive and able to monitor the light emission intensity in a noncontact manner.

Figure 23:
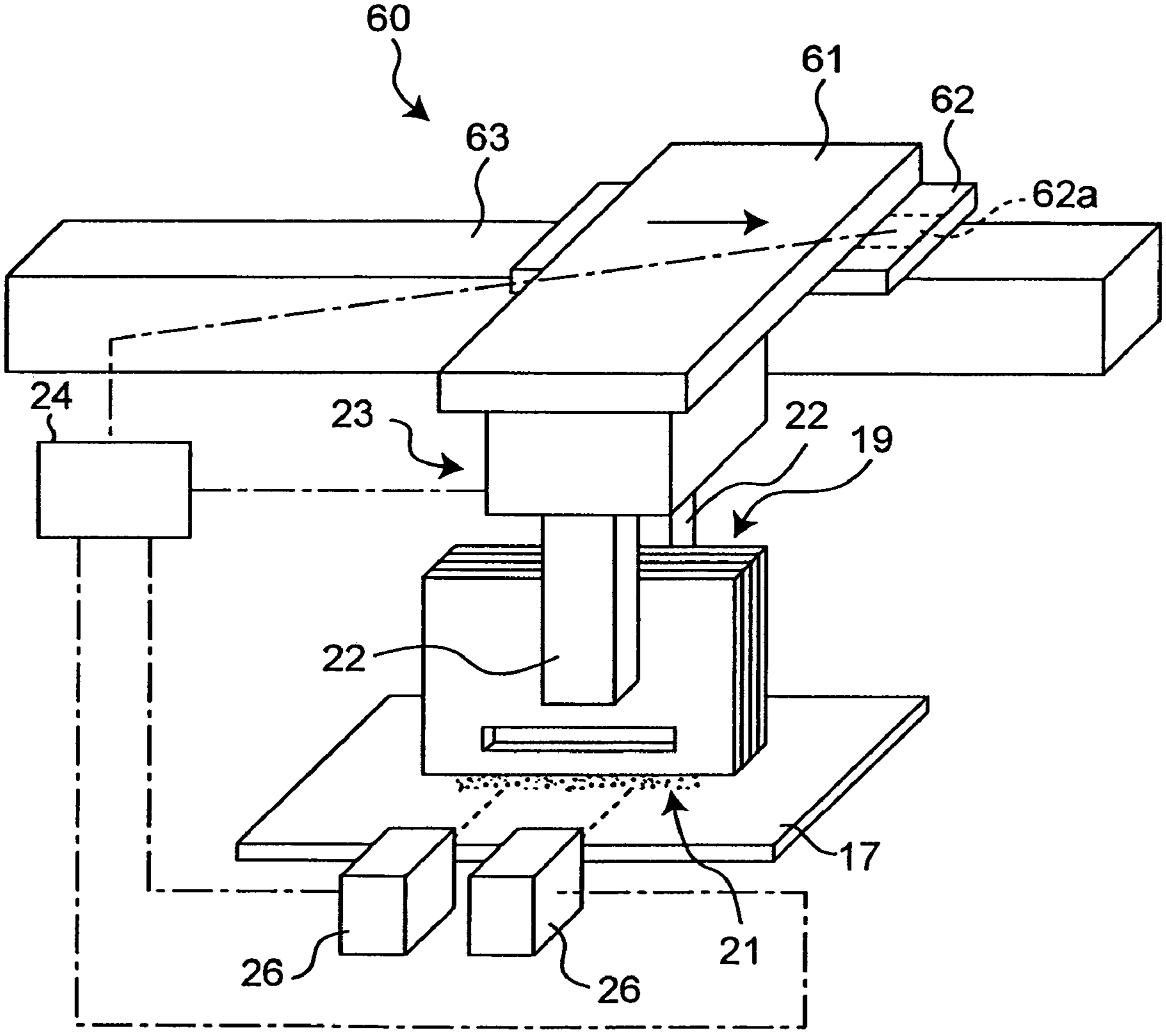
FIG. 23 is a perspective view showing a plasma processing apparatus according to a modification example of FIG. 22 together with a transport unit.

FIG. 23 shows the case where the light emission monitor located in the vicinity of the rear end of the inner gas outlet 8 along the direction of movement is shifted toward the front side in comparison with FIG. 22. With this arrangement, a change in the light emission intensity can be observed earlier, and the processing accuracy of the plasma processing can be further improved.

Sixth Embodiment

Figure 9:
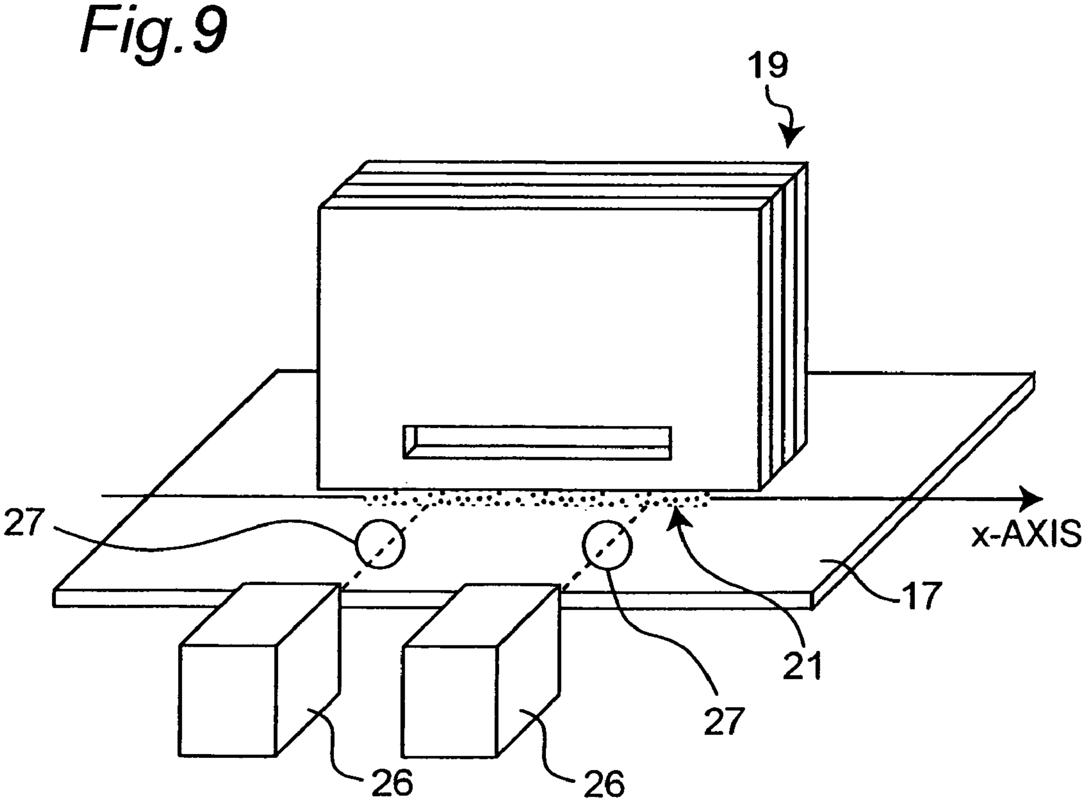
FIG. 9 is a perspective view of the plasma processing apparatus employed in a sixth embodiment of the present invention.

The plasma processing apparatus and a method therefor according to the sixth embodiment of the present invention will be described next with reference to FIG. 9. In FIG. 9, a lens 27 is provided between each photodiode 26 as one example of the light emission monitor and a plasma 21. This arrangement allows the light emission intensity to be monitored with a high spatial resolution, allows more highly accurate monitoring to be achieved and allows the accuracy of the plasma processing to be further improved. It is also possible to reduce the influence of illumination light that becomes an external disturbance by employing a filter that transmits only a prescribed wavelength besides the lens.

Seventh Embodiment

The plasma processing apparatus and a method therefor according to the seventh embodiment of the present invention will be described next with reference to FIG. 10.

Figure 10:
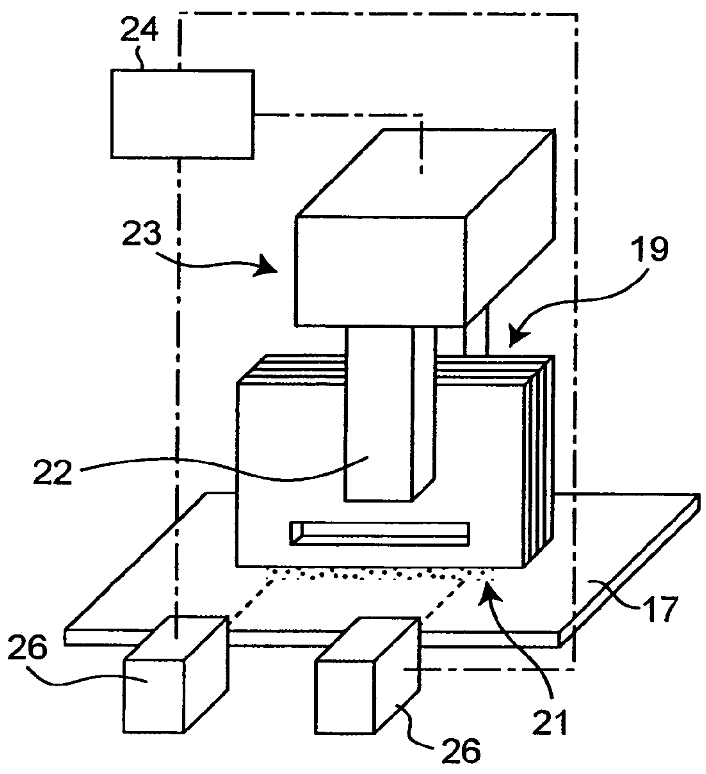
FIG. 10 is a perspective view of the plasma processing apparatus employed in a seventh embodiment of the present invention.

In FIG. 10, a bracket 22 for holding a plasma source 19 is joined to an inclination control unit 23. The inclination control unit can control not only the inclination but also the distance between the plasma source 19 and the object 17 to be processed. Moreover, a position control command can be sent to the inclination control unit 23 by feeding back the measurement result by means of light emission monitors 26 to the control unit 24. That is, position control can be executed by feeding back the result of measuring the light emission intensities of plasma in the two positions to a mechanism for moving the plasma source 19.

Eighth Embodiment

The plasma processing apparatus and a method therefor according to the eighth embodiment of the present invention will be described next with reference to FIG. 11.

Figure 11:
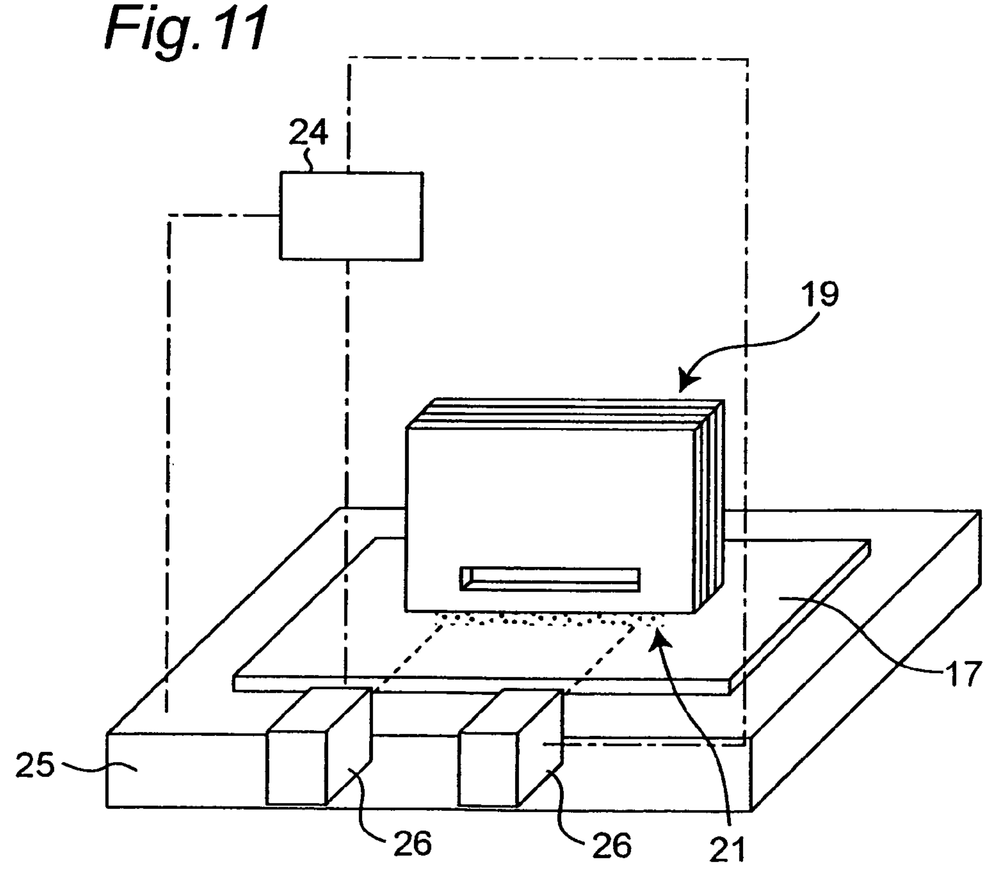
FIG. 11 is a perspective view of the plasma processing apparatus employed in an eighth embodiment of the present invention.

In FIG. 11, a sample holder 25 for holding an object 17 to be processed is provided, and the sample holder 25 has a built-in inclination control mechanism capable of controlling not only the inclination but also the distance between the plasma source 19 and the object 17 to be processed. Moreover, a position control command can be sent to the sample holder 25 by feeding back the measurement result by means of light emission monitors 26 to the control unit 24. That is, position control can be executed by sending the results of measuring the light emission intensities of the plasma in the two positions to the mechanism for moving the object 17 to be processed.

Ninth Embodiment

The plasma processing apparatus and a method therefor according to the ninth embodiment of the present invention will be described next with reference to FIG. 12.

Figure 12:
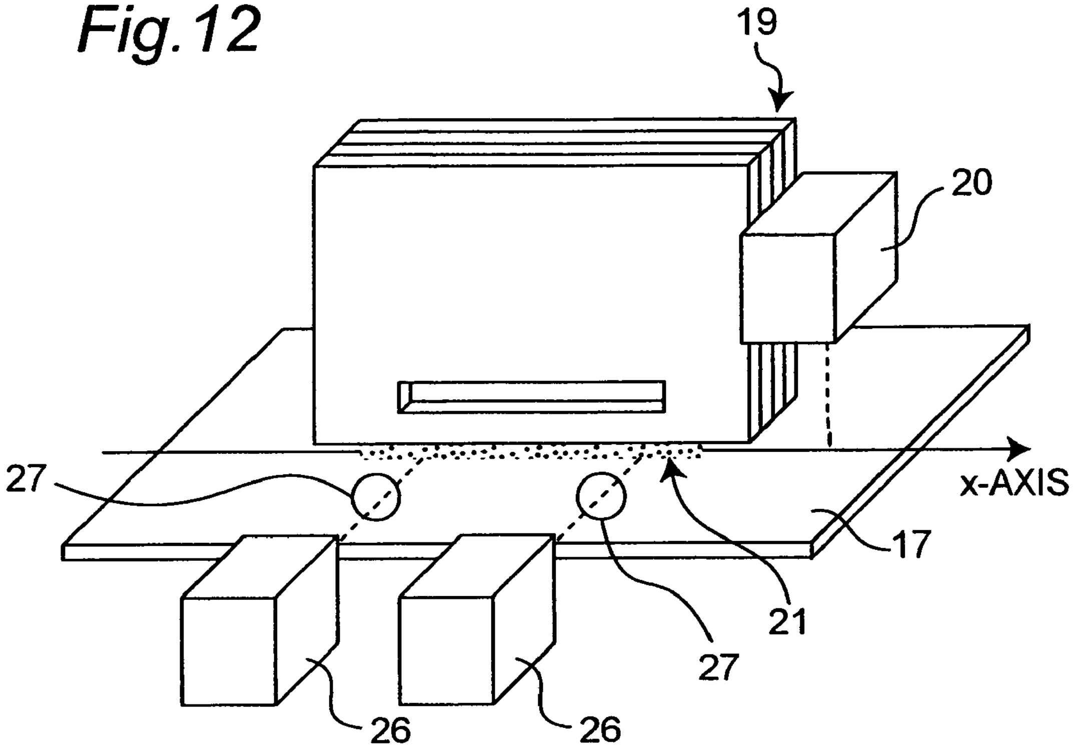
FIG. 12 is a perspective view of the plasma processing apparatus employed in a ninth embodiment of the present invention.

In FIG. 12, a laser length measuring unit 20 for measuring the distance between the plasma source 19 and the object 17 to be processed is provided in addition to the light emission monitors 26 for measuring the light emission intensities in two different x-coordinate positions. With the above construction, the distance between the plasma source 19 and the object 17 to be processed can also be controlled while controlling the inclination. This system has an advantage that the number of laser length measuring units, which are expensive in comparison with the photodiode, to be used can be minimized.

Tenth Embodiment

The plasma processing apparatus and a method therefor according to the tenth embodiment of the present invention will be described next with reference to FIG. 13.

Figure 13:
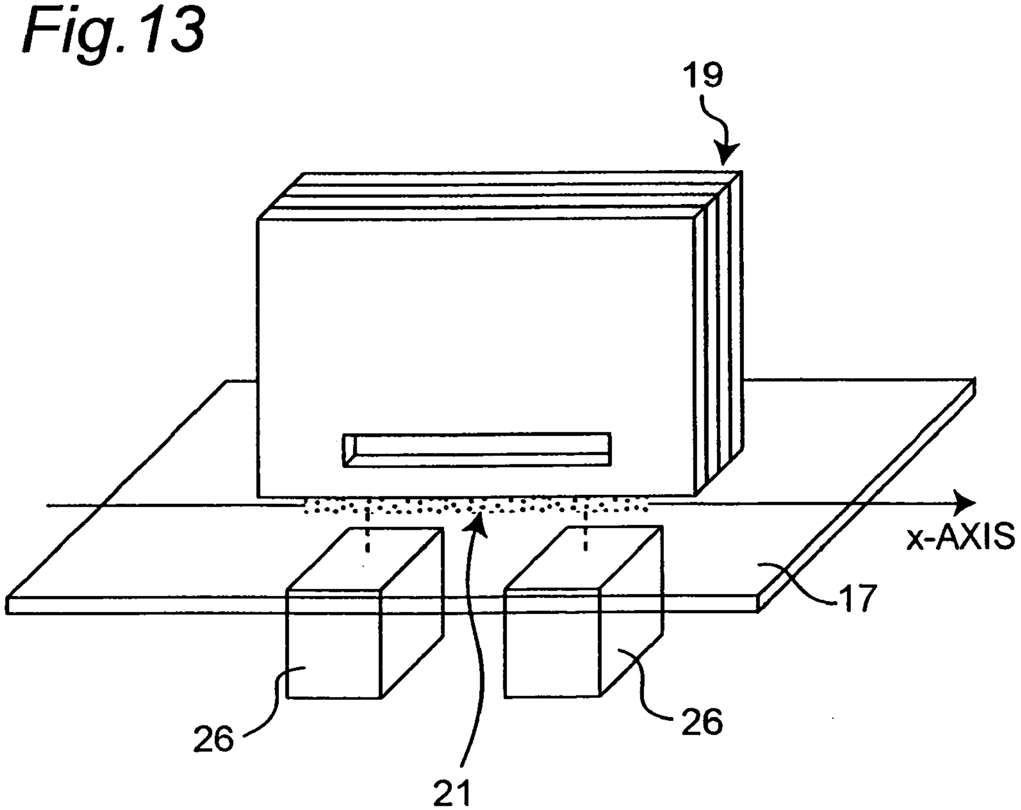
FIG. 13 is a perspective view of the plasma processing apparatus employed in a tenth embodiment of the present invention.
Figure 16A:
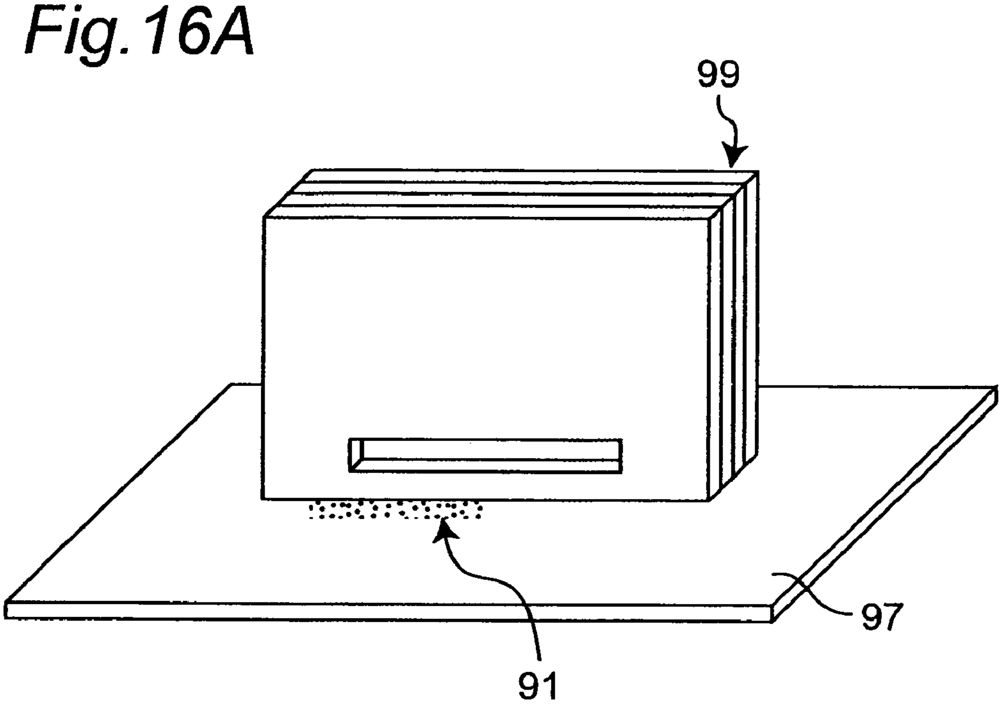
FIGS. 16A and 16B are a perspective view and a side view of the plasma processing apparatus being proposed.
Figure 16B:
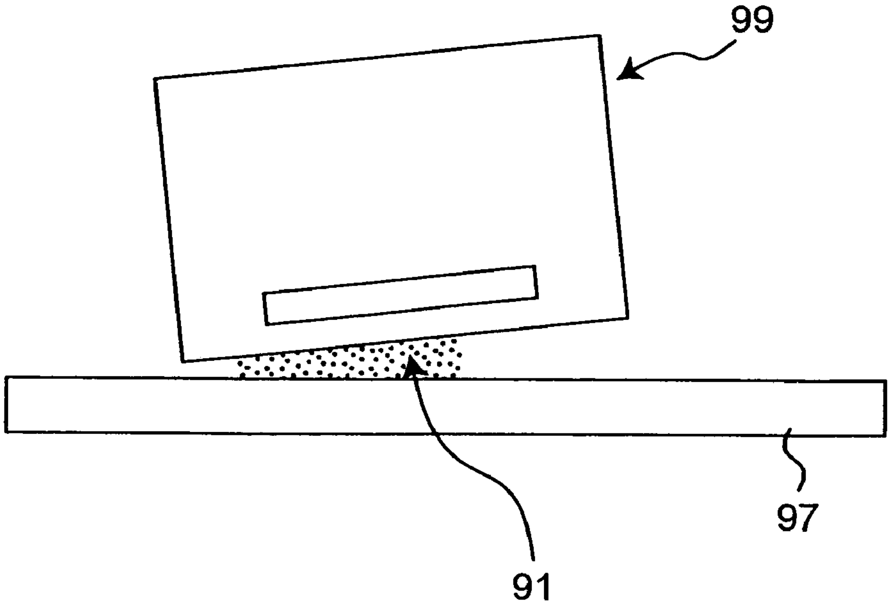

In FIG. 13, a thin plate 17 as one example of the object to be processed is made of a transparent material (for example, a glass substrate). Therefore, by providing light emission monitors 26 in positions opposite from the plasma source 19 with respect to the thin plate 17, the light emission intensities can be measured simply and accurately.

Eleventh Embodiment

The plasma processing apparatus and a method therefor according to the eleventh embodiment of the present invention will be described next with reference to FIG. 6. Since the basic operation of the plasma processing apparatus shown in FIG. 6 has already been described in connection with the third embodiment of the present invention, the method for correcting the length measuring unit 20 will be described here. A linear plasma is generated by providing a thin plate 17 that is a silicon substrate as one example of the object to be processed for a test, arranging the silicon substrate 17 and the plasma source 19 with their relative positions fixed and supplying an electric power to an electrode provided at the plasma source 19 or the object 17 to be processed for a test while supplying gas to the plasma source 19. Then, activated particles generated by the plasma are made to act on the object 17 to be processed for a test, processing a linear portion on the surface of the object 17 to be processed for a test. Next, the distribution in the linear direction of processing speed in the processed linear portion on the surface of the object 17 to be processed for a test is measured. This series of work is repetitively carried out while changing the inclination of the object to be processed for a test with respect to the plasma source in the linear direction little by little until the distribution in the linear direction of an etching depth becomes equal to or smaller than prescribed variation. Then, the length measuring unit can be calibrated if "the distance between the plasma source and the object to be processed in the two different x-coordinate positions when the distribution in the linear direction of the etching depth become equal to or smaller than prescribed variation is equalized". After the completion of the calibration, a linear plasma is generated by supplying an electric power to the electrode provided at the plasma source 19 or an object 17 to be processed while supplying gas to the plasma source 19 arranged in the neighborhood of the object 17 to be processed and measuring the distances between the plasma source 19 and the object 17 to be processed in the two different x-coordinate positions on an object 17 to be processed desired to be actually processed, making activated particles generated by the plasma act on the object 17 to be processed and processing the surface of the object 17 to be processed, plasma processing capable of accurately controlling the processing speed can be achieved.

It is acceptable to employ another material instead of the silicon substrate employed as the object to be processed for a test.

Moreover, when dotted portions are processed instead of processing a linear portion, there may be provided only one length measuring unit for measuring the distance between the plasma source and the object to be processed. In this case, the processing may be carried out with a construction that includes a first process for processing a surface of an object to be processed for a test by generating a linear plasma by supplying an electric power to an electrode provided at a plasma source or an object to be processed for a test while supplying gas to the plasma source arranged in the neighborhood of the object to be processed for a test with their relative positions fixed and making activated particles generated by the plasma act on the object to be processed for a test, a second process for measuring a processing speed in the processed portion on the surface of the object to be processed for a test, a third process for carrying out calibration of a length measuring unit for measuring the distance between the plasma source and the object to be processed on the basis of a measurement result of the second process, and a fourth process for processing the surface of the object to be processed by generating a linear plasma by supplying an electric power to the electrode provided at the plasma source or the object to be processed while supplying gas to the plasma source arranged in the neighborhood of the object to be processed and measuring the distance between the plasma source and the object to be processed and making activated particles generated by the plasma act on the object to be processed. In this case, by employing a silicon substrate as the object to be processed for a test, processing the surface of the object to be processed for a test by etching in the first process, measuring the etching depth in the second process and carrying out the calibration of the length measuring unit by a relation between a preparatorily obtained etching rate of the silicon substrate and the distance between the plasma source and the object to be processed in the third process, the calibration can easily be achieved.

Twelfth Embodiment

Figure 17:
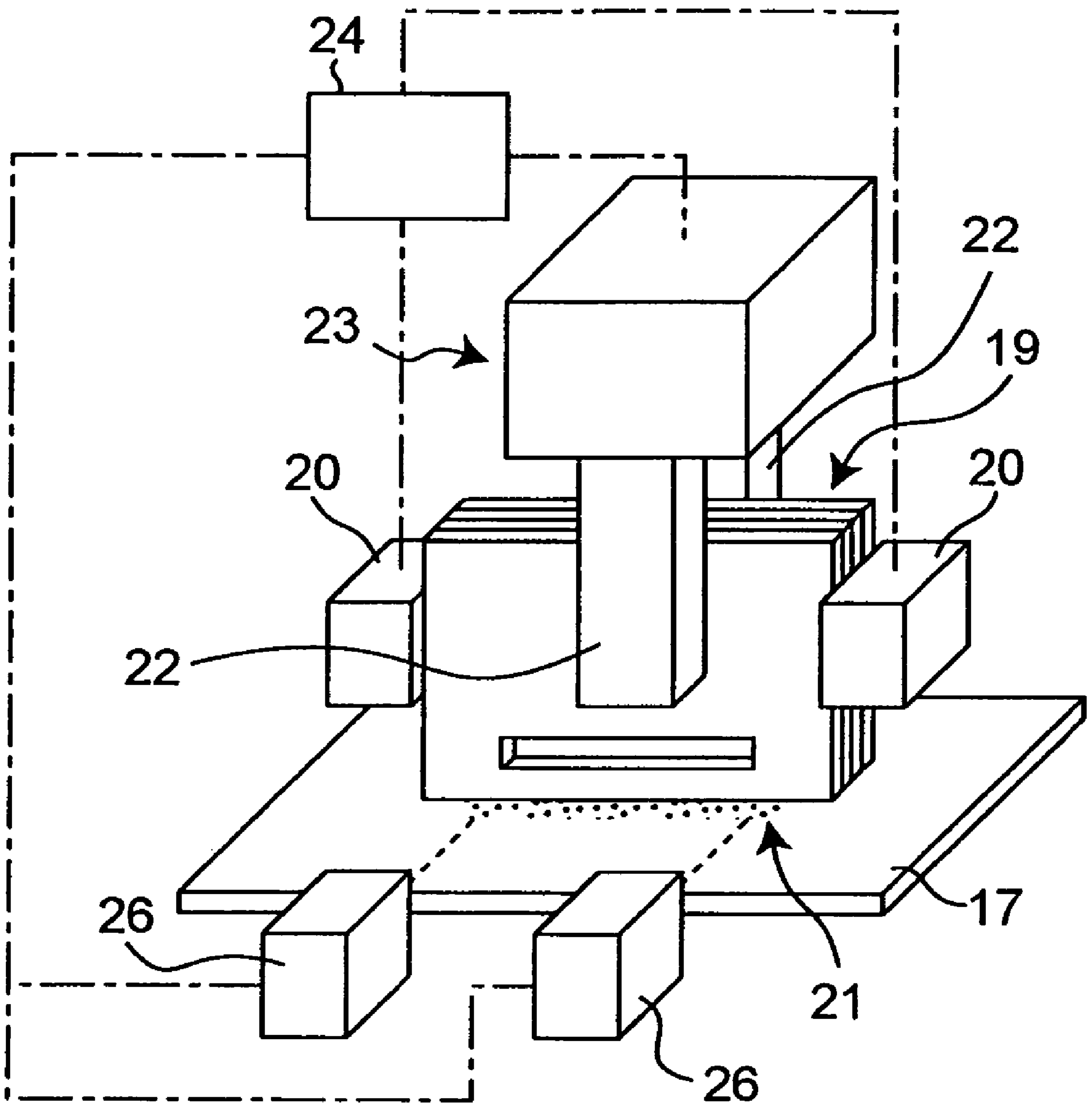
FIG. 17 is a perspective view of the plasma processing apparatus employed in a twelfth embodiment of the present invention.

The plasma processing apparatus and a method therefor according to the twelfth embodiment of the present invention will be described next with reference to FIG. 17. In FIG. 17, a bracket 22 for holding a plasma source 19 is joined to an inclination control unit 23. The inclination control unit 23 can control not only inclination but also a distance between the plasma source 19 and a thin plate 17 as one example of the object to be processed. Moreover, a position control command can be sent to the inclination control unit 23 by feeding back the result of the measurement result by means of laser length measuring units 20 to a control unit 24. That is, the result of measuring the distances between the plasma source 19 and the object 17 to be processed in two positions can be fed back to the mechanism for moving the plasma source 19. Moreover, two photodiodes 26 as one example of the light emission monitor are provided in the sideways direction so that light emission from the linear plasma generated in a space located between the plasma source 19 and the thin plate 17 can be observed. Moreover, when the x-axis is taken in the linear direction, the light emission intensities of plasma in the two different x-coordinate positions can be monitored.

A method for calibrating the length measuring unit 20 in the plasma processing apparatus with the aforementioned constitution will be described. A linear plasma is generated by providing a thin plate 17 that is a silicon substrate as one example of the object to be processed for a test, arranging the thin plate 17 and the plasma source 19 with their relative positions fixed, and supplying an electric power to an electrode provided at the plasma source 19 or the object 17 to be processed for a test while supplying gas to the plasma source 19. Then, by making activated particles generated by the plasma act on the object 17 to be processed for a test while monitoring the light emission intensities of plasma in the two different x-coordinate positions by means of light emission monitors 26, a linear portion on the surface of the object 17 to be processed for a test is processed. At this time, the inclination of the object to be processed for a test with respect to the plasma source in the linear direction is changed little by little and repetitively carried out until the variation in the light emission intensities of plasma in the two different x-coordinate positions becomes equal to or smaller than prescribed variation. Then, the length measuring unit can be calibrated if "the distance between the plasma source and the object to be processed in the two different x-coordinate positions when the variation in the light emission intensities of plasma in the two different x-coordinate positions becomes equal to or smaller than prescribed variation is equalized". After the completion of the calibration, a linear plasma is generated by supplying an electric power to the electrode provided at the plasma source 19 or the object 17 to be processed while supplying gas to the plasma source 19 arranged in the neighborhood of the object 17 to be processed and measuring the distances between the plasma source 19 and the object 17 to be processed in the two different x-coordinate positions on an object 17 to be processed desired to be actually processed, making activated particles generated by the plasma act on the object 17 to be processed and processing the surface of the object 17 to be processed, plasma processing capable of accurately controlling the processing speed can be achieved.

It is acceptable to employ another material instead of the silicon substrate employed as the object to be processed for a test.

Moreover, when dotted portions are processed instead of processing a linear portion, there may be provided only one length measuring unit and only one light emission monitor for measuring the distance between the plasma source and the object to be processed. In this case, the processing may be carried out with a construction that includes a first process for processing the surface of an object to be processed for a test by generating a linear plasma by supplying an electric power to an electrode provided at the plasma source or the object to be processed for a test while supplying gas to the plasma source arranged in the neighborhood of the object to be processed for a test with their relative positions fixed, monitoring the light emission intensity of plasma, and making activated particles generated by the plasma act on the object to be processed for a test, a second process for carrying out calibration of the length measuring unit for measuring the distance between the plasma source and the object to be processed, on the basis of the result of monitoring the light emission intensity in the first process, and a third process for processing the surface of the object to be processed by generating a linear plasma by supplying an electric power to the electrode provided at the plasma source or the object to be processed while supplying gas to the plasma source arranged in the neighborhood of the object to be processed and measuring the distance between the plasma source and the object to be processed, and making activated particles generated by the plasma act on the object to be processed. In this case, by carrying out the calibration of the length measuring unit by a relation between a preparatorily obtained light emission intensity and the distance between the plasma source and the object to be processed in the third process, the calibration can easily be achieved.

Thirteenth Embodiment

Figure 18:
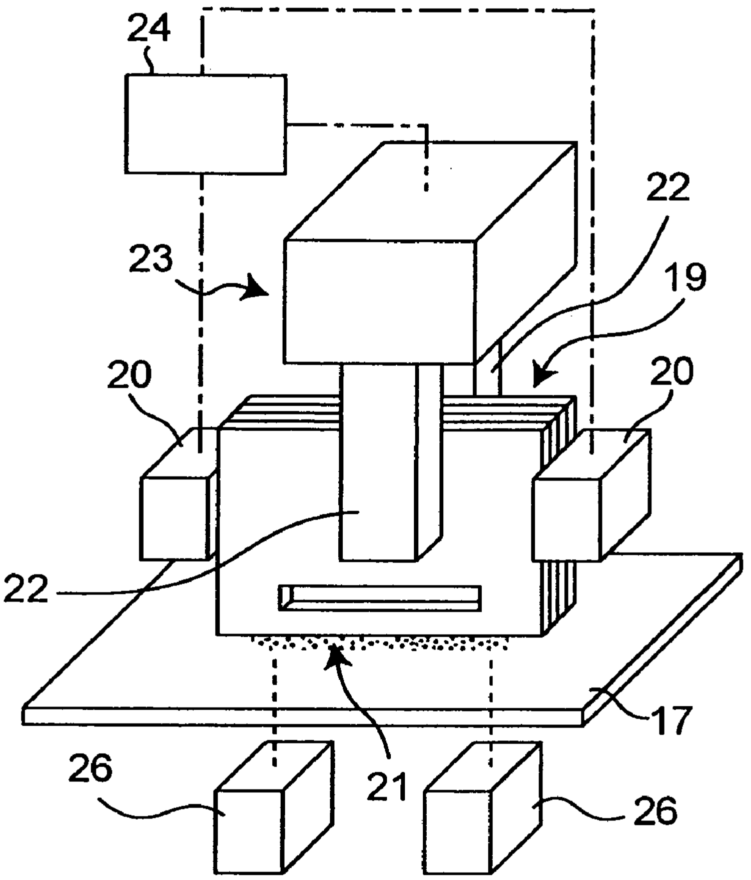
FIG. 18 is a perspective view of the plasma processing apparatus employed in a thirteenth embodiment of the present invention.

The plasma processing apparatus and a method therefor according to the thirteenth embodiment of the present invention will be described next with reference to FIG. 18. In this apparatus, the two photodiodes 26 as one example of the light emission monitors, which have been provided in the sideways direction in FIG. 17, are provided in positions on the side opposite from the plasma source 19 with respect to the thin plate 17. A transparent material (for example, a glass substrate) can be employed as the object 17 to be processed for a test, so that the length measuring unit 20 can be calibrated more simply and accurately.

Fourteenth Embodiment

Figure 19:
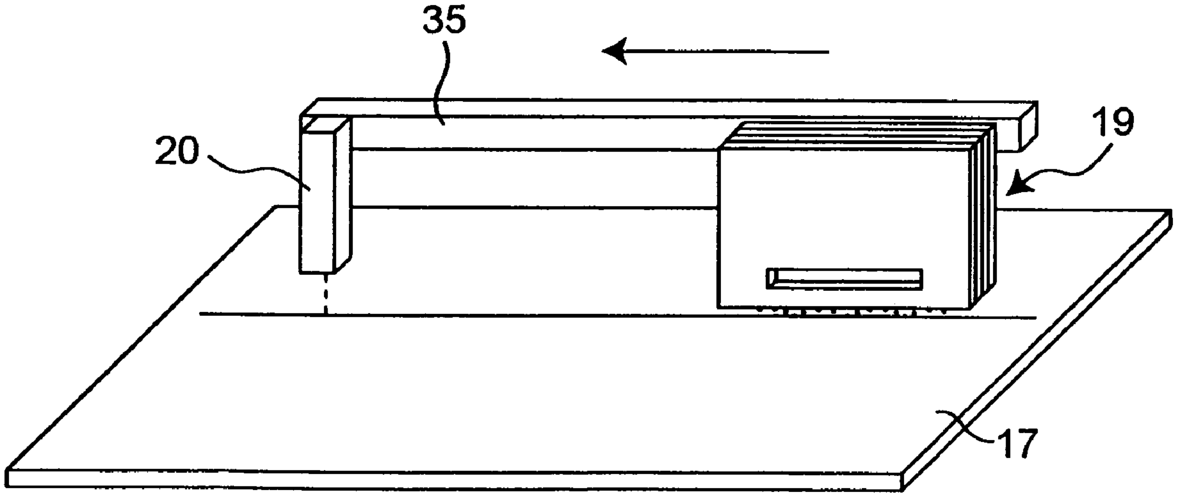
FIG. 19 is a perspective view of the plasma processing apparatus employed in a fourteenth embodiment of the present invention.

The plasma processing apparatus and a method therefor according to the fourteenth embodiment of the present invention will be described next with reference to FIG. 19. In FIG. 19, a plasma source 19 and a length measuring unit 20 are fixed to a holder 35. A linear plasma is generated by supplying an electric power to an electrode provided at the plasma source 19 or the object 17 to be processed while supplying gas to the plasma source 19 arranged in the neighborhood of the object 17 to be processed. By moving the plasma source 19 in the linear direction (from right to left in FIG. 19) with the distance between the object 17 to be processed and the plasma source 19 maintained almost constant while making activated particles generated by the plasma act on the object 17 to be processed, a linear portion on the surface of the object to be processed is processed. At this time, since the processing is carried out by measuring the distance between the plasma source 19 and the object 17 to be processed by using a length measuring unit 20 arranged in a position apart from the plasma source 19 in the direction in which the plasma source 19 moves, there can be achieved plasma processing capable of accurately controlling the processing speed even when the surface of the object 17 to be processed waves. This is ascribed to the fact that a time lag is attributed to a time required for calculation in feeding back the result of measuring the distance between the plasma source 19 and the object 17 to be processed to a mechanism (for example, the transport unit 60 in FIG. 21) for moving the plasma source 19.

Of course, there can be achieved plasma processing capable of accurately controlling the processing speed even when the surface of the object 17 to be processed waves by carrying out the processing while measuring the distance between the plasma source and the object to be processed by using the length measuring unit arranged in the position apart from the plasma source in the direction opposite to the direction in which the object to be processed moves similarly to the case where a linear portion on the surface of the object to be processed is processed by moving the object 17 to be processed in the linear direction with the distance between the object 17 to be processed and the plasma source 19 maintained almost constant.

In the aforementioned first through fourteenth embodiments of the present invention, there has been exemplified the case where the four ceramic plates are used as the plasma source. However, it is possible to employ a variety of microplasma sources such as the capillary types of a parallel plate type capillary type, an inductive coupling type capillary type, and so on; a microgap system; and an inductive coupling type tube type. In particular, in the type that employs a knife-edge-shaped electrode 25 as shown in FIG. 14, since the distance between the electrode and the object to be processed is short, a plasma of an extremely high density is formed in the minute portion. Therefore, the present invention is especially effective. In FIG. 14, the plasma source is constructed of an outside plate 28, inside plates 29 and 30, an outside plate 31, which are made of ceramics, and an electrode 32. The outside plates 28 and 31 are provided with an outside gas passage 5 and an outer gas outlet 6, while the inside plates 29 and 30 are provided with an inside gas passage 7 and an inner gas outlet 8. The electrode 32 has a knife-edge-shaped lowermost portion and is able to effect plasma processing in a minute linear region.

Moreover, by supplying a dc voltage or a high-frequency power to the object to be processed, it is also possible to strengthen the action of drawing in the ions in the plasma. In this case, the electrode may be grounded or maintained at a floating potential.

Although there has been exemplified the case of the linear plasma generated by using the high-frequency power, it is possible to generate a linear plasma by using a high-frequency power of a frequency ranging from several hundred kilohertz to several gigahertz. Otherwise, it is possible to use a dc power or supply a pulse power.

Moreover, although it has been exemplified the case where the thickness of the fine line that constitutes the opening of the plasma source is 0.1 mm, the width of the opening of the plasma source is not limited to this. The present invention is also effective for a plasma source of a width of not smaller than 1 mm and also effective for a plasma source of a great width of not smaller than about 100 mm according to circumstances.

Fifteenth Embodiment

The plasma processing of the prior art example has had issues that the processing area has not become constant, an unprocessed portion has been left, and processing has conversely become excessive. Especially, in the case where the processing is carried out while moving the relative positions of the microplasma source and the object to be processed, there have been issues that neither processing line width nor processing result becomes uniform even when the processing is carried out with movement at a constant speed so long as the processing speed is varied.

In view of the aforementioned conventional issues, the fifteenth and subsequent embodiments of the present invention are intended to provide a plasma processing method and apparatus capable of carrying out uniform processing.

The plasma processing apparatus and a method therefor according to the fifteenth embodiment of the present invention will be described below with reference to FIGS. 1 through 3 and FIGS. 24 through 25. It is to be noted that since the basic construction and operation of the microplasma source shown in FIGS. 1 through 3 have been described in connection with the first embodiment, no detail is herein provided therefor.

Figure 24:
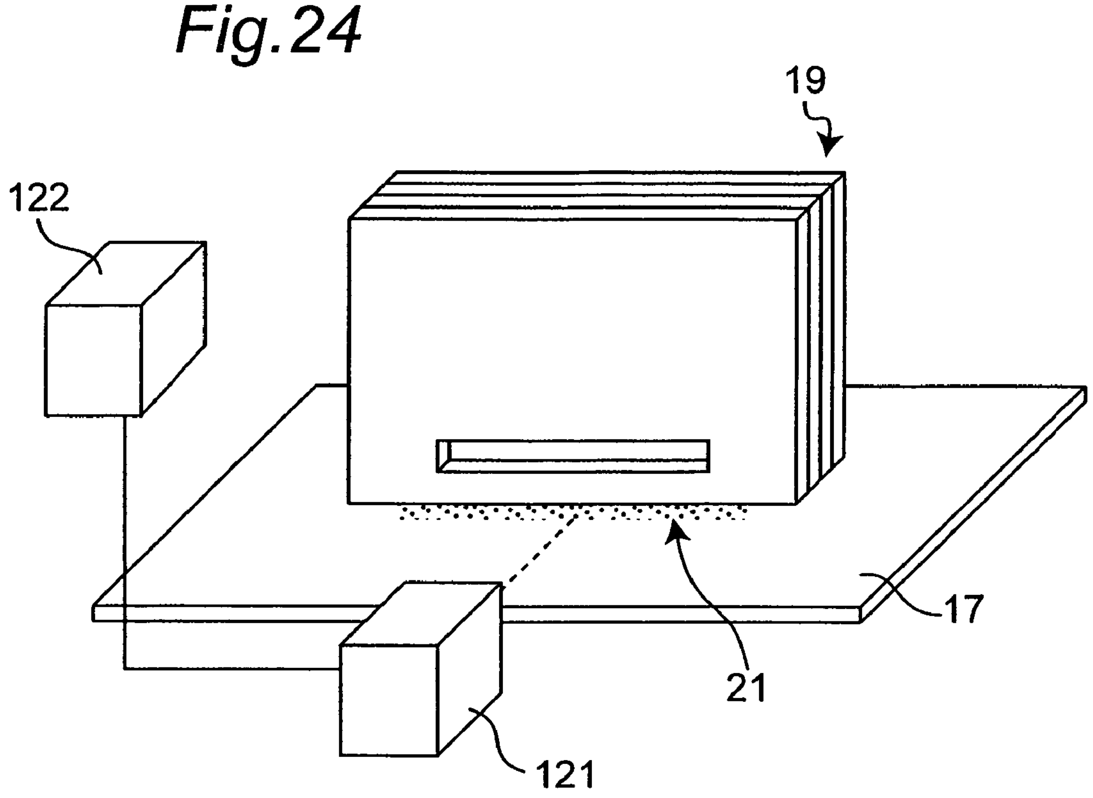
FIG. 24 is a perspective view of the plasma processing apparatus employed in a fifteenth embodiment of the present invention.

FIG. 24 is a perspective view showing the construction of the plasma processing apparatus employed in the fifteenth embodiment of the present invention. In FIG. 24, a thin plate 17 as one example of the object to be processed and a plasma source 19 are arranged oppositely to each other, and a minute linear plasma 21 is generated between the thin plate 17 and the plasma source 19, allowing a minute linear portion on the thin plate 17 to be processed by plasma. A light emission monitor 121 for monitoring the light emission intensity of plasma and an end point detector 122 for executing end point detection of the plasma processing on the basis of the result of monitoring the light emission intensity are provided.

The plasma source 19 as described above, which can operate from several Pascals to several atmospheric pressures, operates typically at a pressure within a range of about 10000 Pa to three atmospheric pressures. In particular, operation at and around the atmospheric pressure is especially preferable since neither a strict sealed structure nor special exhaust system is necessary and the diffusion of plasmas and activated particles is moderately restrained.

By carrying out the plasma processing in the plasma processing apparatus constructed as above, there can be achieved plasma processing such that the processing area becomes constant can be achieved dissimilarly to the prior art method of carrying out the plasma processing continuously for a prescribed time. Moreover, there occurs neither a remaining unprocessed portion nor conversely, excessive processing. That is, uniform plasma processing can be achieved. This takes advantage of the fact that the light emission monitoring value changes in accordance with a change in the state of plasma processing. For example, during the etching process, the light emission particular to the element contained in the thin film becomes not observed and the light emission intensity changes when the thin film on the thin plate 17 disappears by etching.

Figure 25:
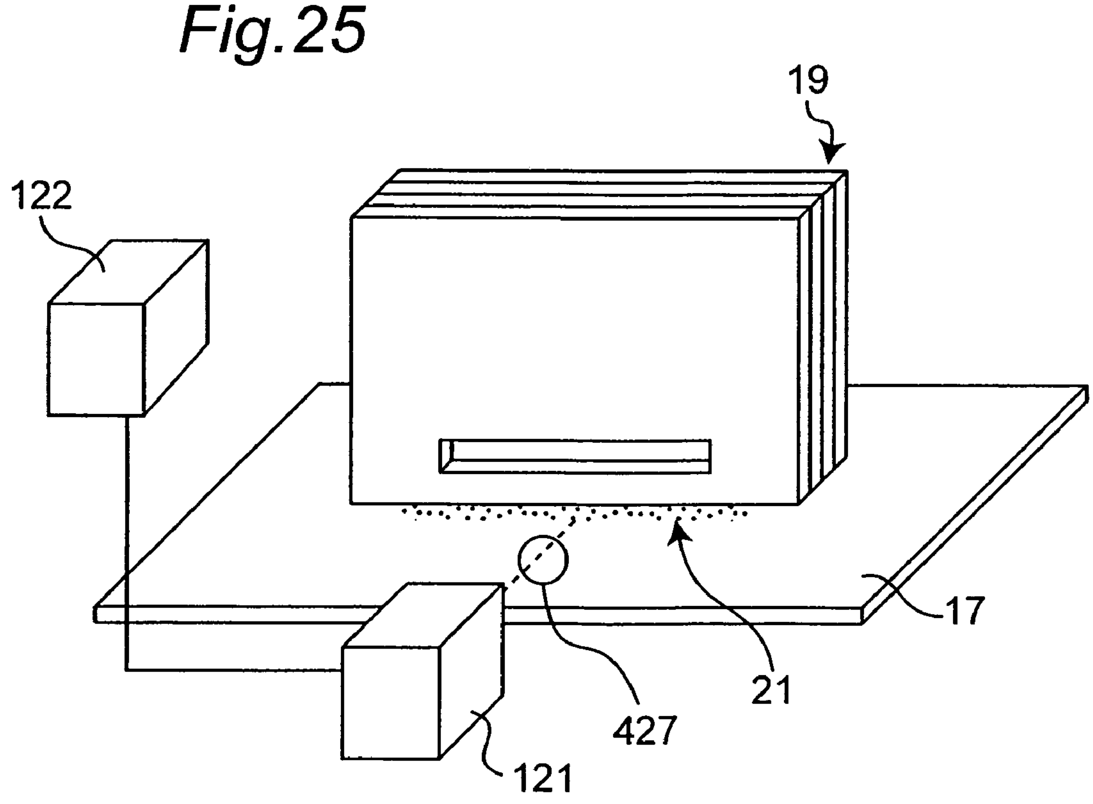
FIG. 25 is a perspective view of the plasma processing apparatus employed in the fifteenth embodiment of the present invention.

Otherwise, the light emission particular to the etchant in the activated particles increases, and the light emission intensity changes. During the film forming process, if a thin film is deposited on the thin plate 17, then the reflectance of light on the surface of the thin plate 17 changes, and the light emission intensity changes. As a concrete method for detecting the end point, it is acceptable to make a time point at which a value obtained by integrating the light emission intensity of the plasma by the processing time becomes a prescribed value serve as the end point, or make a time point at which the light emission intensity is changed serve as the end point. Moreover, as shown in FIG. 25, more accurate end point detection becomes possible by performing monitoring aimed at the light emission particular to the element contained in the thin film or the light emission particular to the etchant in the activated particles via a filter 427 for monitoring the light emission intensity at a prescribed wavelength.

Sixteenth Embodiment

Figure 26:
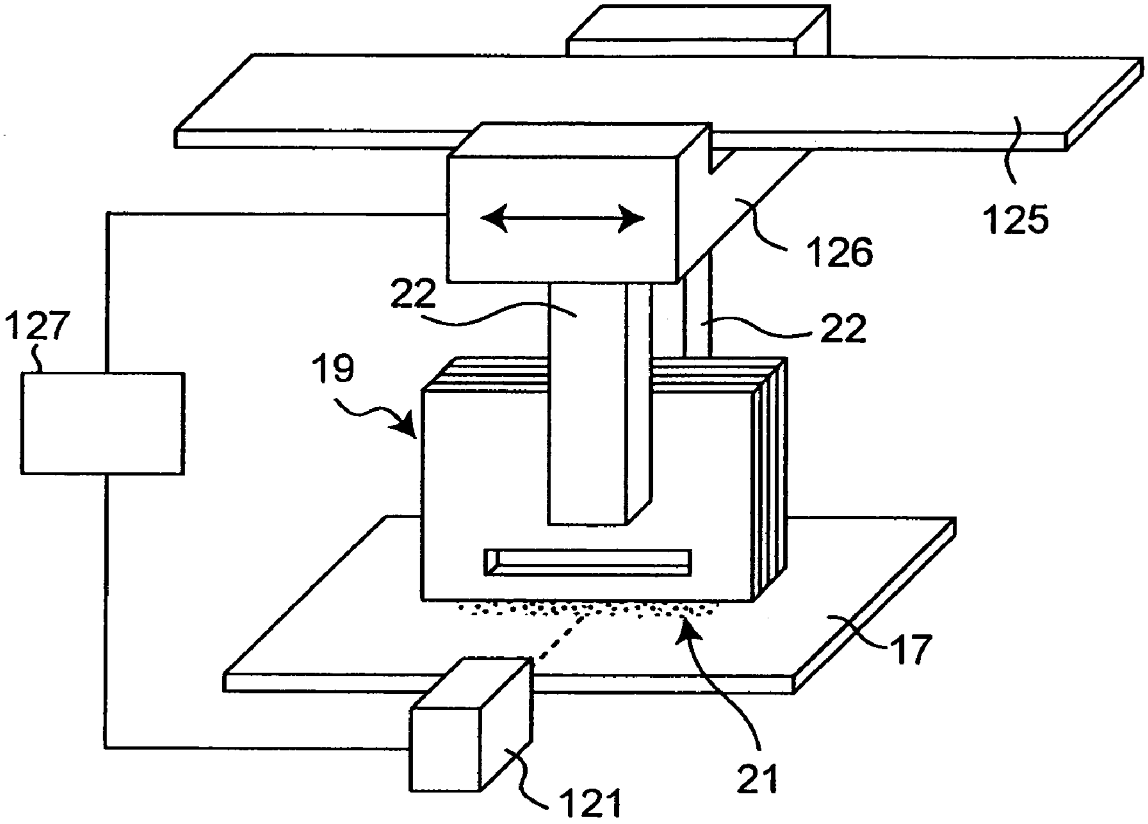
FIG. 26 is a perspective view of the plasma processing apparatus employed in a sixteenth embodiment of the present invention.

The plasma processing apparatus and a method therefor according to the sixteenth embodiment of the present invention will be described next with reference to FIG. 26. In FIG. 26, a pair of brackets 22 for holding a plasma source 19 are joined to a linear slider 126 meshed with a rail 125. By applying a motion in a direction parallel to the surface of a thin plate 17 to a plasma source 19, a long fine line processing can be effected on the thin plate 17. That is, a mechanism for changing the relative positions of the plasma source 19 and the object to be processed is provided, and a light emission monitor 121 for monitoring the light emission intensity of plasma is further provided, making it possible to change the amount of control of the linear slider 126 by a control unit 127 on the basis of the result of monitoring the light emission intensity and perform more accurate position change rate control by feedbacking to the relative position change rate of the plasma source 19 with respect to the object to be processed.

By carrying out the plasma processing in the plasma processing apparatus constructed as above, plasma processing, such that the processing line width becomes constant, can be achieved dissimilarly to the prior art method of carrying out the plasma processing at a prescribed position change rate. Moreover, there occurs neither a remaining unprocessed portion nor excessive processing. That is, uniform plasma processing can be achieved. This takes advantage of the fact that the light emission monitoring value changes in accordance with a change in the state of plasma processing. It is to be noted that more accurate position change rate control becomes possible by performing monitoring aimed at the light emission particular to the element contained in the thin film or the light emission particular to the etchant in the activated particles via a filter for monitoring the light emission intensity at a prescribed wavelength.

Seventeenth Embodiment

Figure 27:
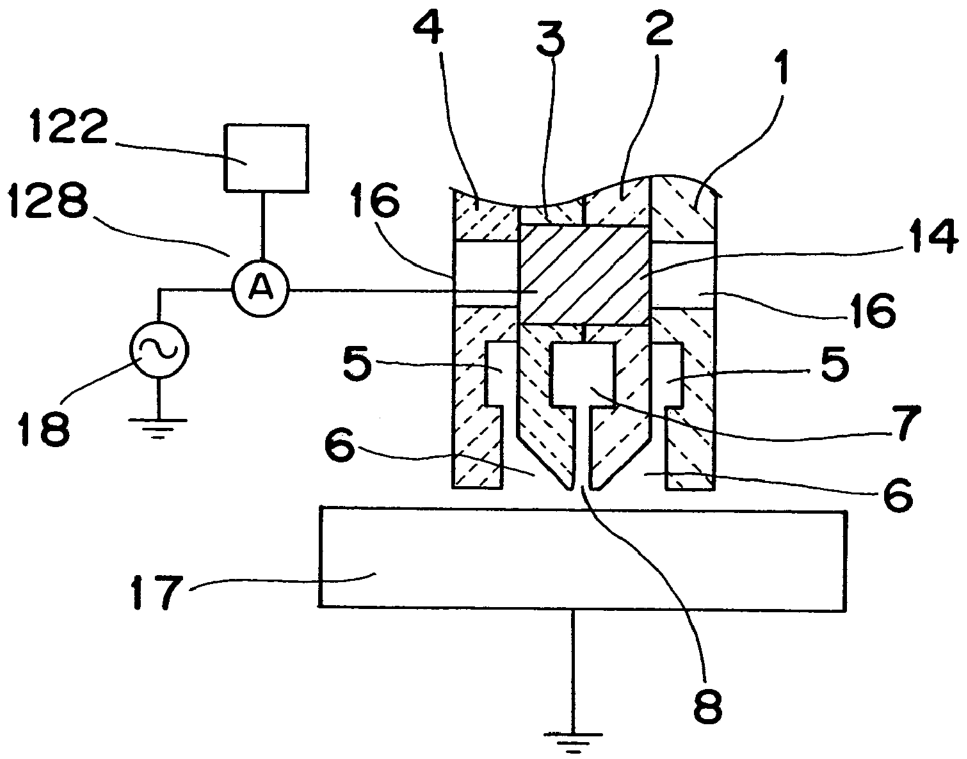
FIG. 27 is a sectional view of the plasma processing apparatus employed in a seventeenth embodiment of the present invention.

The plasma processing apparatus and a method therefor according to the seventeenth embodiment of the present invention will be described next with reference to FIG. 27. In FIG. 27, a current monitor 128 for monitoring a high-frequency current supplied to an electrode 14 is provided, and an end point detector 122 for executing end point detection of the plasma processing on the basis of the result of monitoring the current is provided.

By carrying out the plasma processing in the plasma processing apparatus constructed as above, plasma processing, such that the processing area becomes constant, can be achieved dissimilarly to the prior art method of carrying out the plasma processing continuously for a prescribed time. Moreover, there occurs neither a remaining unprocessed portion nor excessive processing. That is, uniform plasma processing can be achieved. This takes advantage of the fact that the current monitoring value changes in accordance with a change in the state of plasma processing. For example, during the etching process, if the thin film on the thin plate 17 disappears due to etching, then the impedance of the plasma changes, and the current value changes even when a constant electric power is supplied. During the film forming process, if a thin film is deposited on the thin plate 17, then the impedance of the plasma changes, and the current value changes even when a constant electric power is supplied. As a concrete method for executing the end point detection, it is acceptable to make a time point at which a value obtained by integrating the current by the processing time becomes a prescribed value serve as the end point, or make a time point at which the current changes serve as the end point.

Moreover, more accurate end point detection sometimes becomes possible by monitoring the current via a filter for monitoring a prescribed higher harmonic wave. Moreover, it is acceptable to monitor the voltage value or the current value while carrying out the processing at a constant electric power or monitor the power value or the current value at a constant voltage.

Eighteenth Embodiment

Figure 28:
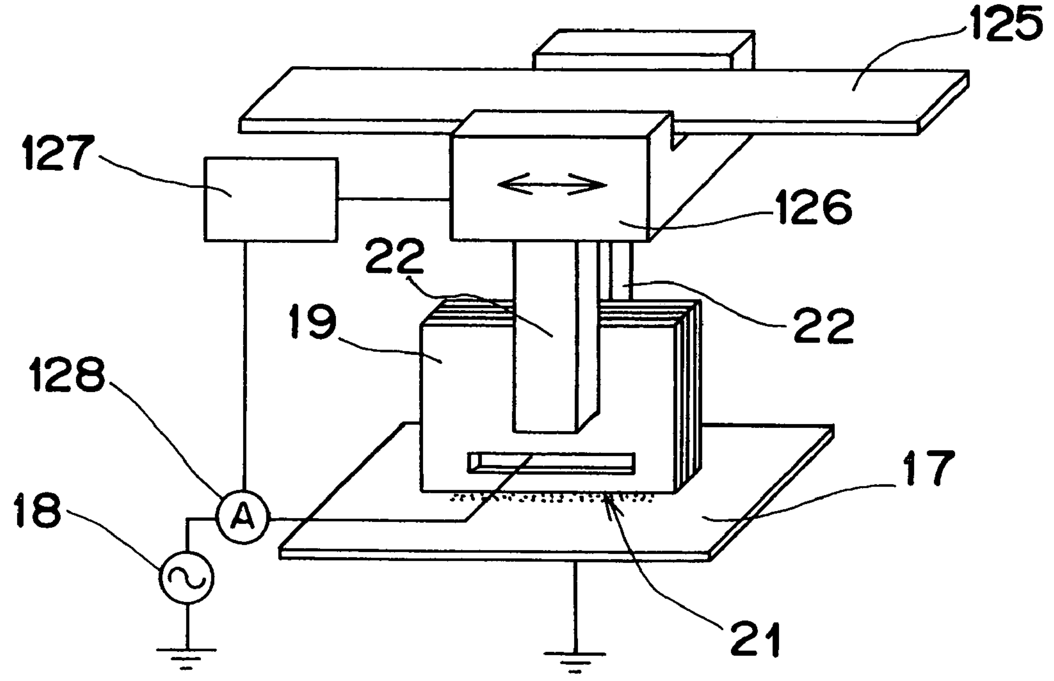
FIG. 28 is a perspective view of the plasma processing apparatus employed in an eighteenth embodiment of the present invention.

The plasma processing apparatus and a method therefor according to the eighteenth embodiment of the present invention will be described next with reference to FIG. 28. In FIG. 28, a pair of brackets 22 for holding a plasma source 19 are joined to a linear slider 126 meshed with a rail 125. By applying a motion in a direction parallel to the surface of a thin plate 17 to a plasma source 19, a long fine line processing can be effected on the thin plate 17. That is, a mechanism for changing the relative positions of the plasma source and the object to be processed is provided, and a current monitor 128 for monitoring the high-frequency current supplied to an electrode 14 is further provided, making it possible to change the amount of control of the linear slider 126 by a control unit 127 on the basis of the result of monitoring the current value and perform more accurate position change rate control by feedbacking to the relative position change rate of the plasma source 19 with respect to the object to be processed.

Figure 29:
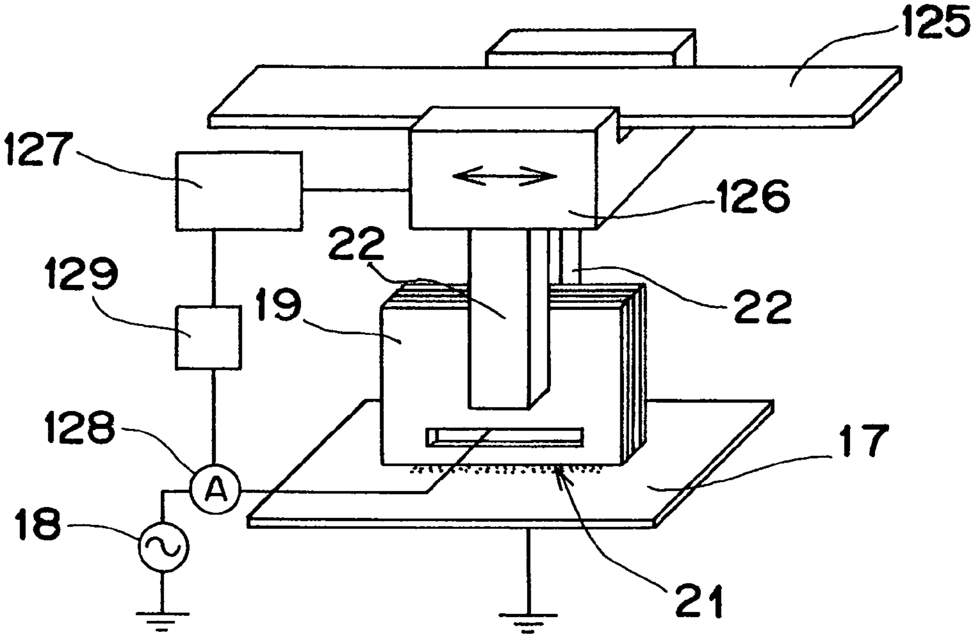
FIG. 29 is a perspective view of the plasma processing apparatus employed in the eighteenth embodiment of the present invention.

By carrying out the plasma processing in the plasma processing apparatus constructed as above, plasma processing, such that the processing line width becomes constant, can be achieved dissimilarly to the prior art method of carrying out the plasma processing at a prescribed position change rate. Moreover, there occurs neither a remaining unprocessed portion nor excessive processing. That is, uniform plasma processing can be achieved. This takes advantage of the fact that the current monitoring value changes in accordance with a change in the state of the plasma processing. As shown in FIG. 29, it sometimes becomes possible to execute more accurate position change rate control by performing monitoring via a filter 129 for monitoring a prescribed higher harmonic wave. Moreover, it is acceptable to monitor the voltage value or the current value while carrying out the plasma processing at a constant electric power or monitor the power value or the current value at a constant voltage.

Nineteenth Embodiment

Figure 30:
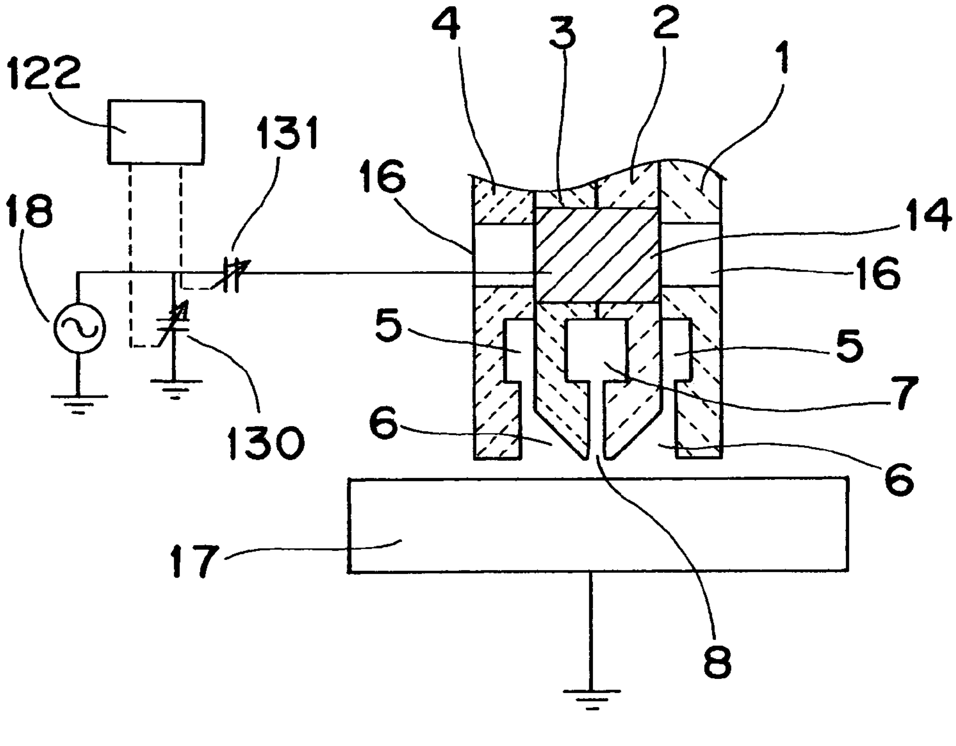
FIG. 30 is a sectional view of the plasma processing apparatus employed in a nineteenth embodiment of the present invention.

The plasma processing apparatus and a method therefor according to the nineteenth embodiment of the present invention will be described next with reference to FIG. 30. In FIG. 30, a high-frequency power is supplied by a power supply 18 to an electrode 14 via variable capacitors 130 and 131 as one example of the variable reactance element that constitutes a matching circuit. The values of the variable capacitors 130 and 131 are monitored, and an end point detector 122 for carrying out the end point detection of the plasma processing on the basis of the result of monitoring the variable capacitor values is provided.

By carrying out the plasma processing in the plasma processing apparatus constructed as above, there can be achieved plasma processing such that the processing area becomes constant dissimilarly to the prior art method of carrying out the plasma processing continuously for a prescribed time. Moreover, there occurs neither a remaining unprocessed portion nor excessive processing. That is, uniform plasma processing can be achieved. This takes advantage of the fact that the matching state changes in accordance with a change in the state of plasma processing. For example, during the etching process, if the thin film on the thin plate 17 disappears due to etching, then the impedance of the plasma changes, and the value of the variable reactance element changes even when a constant electric power is supplied. During the film forming process, if a thin film is deposited on the thin plate 17, then the impedance of the plasma changes, and the value of the variable reactance element changes even when a constant electric power is supplied. As a concrete method for executing the end point detection, it is possible to make a time point at which the value of the variable reactance element is changed serve as the end point.

Twentieth Embodiment

Figure 31:
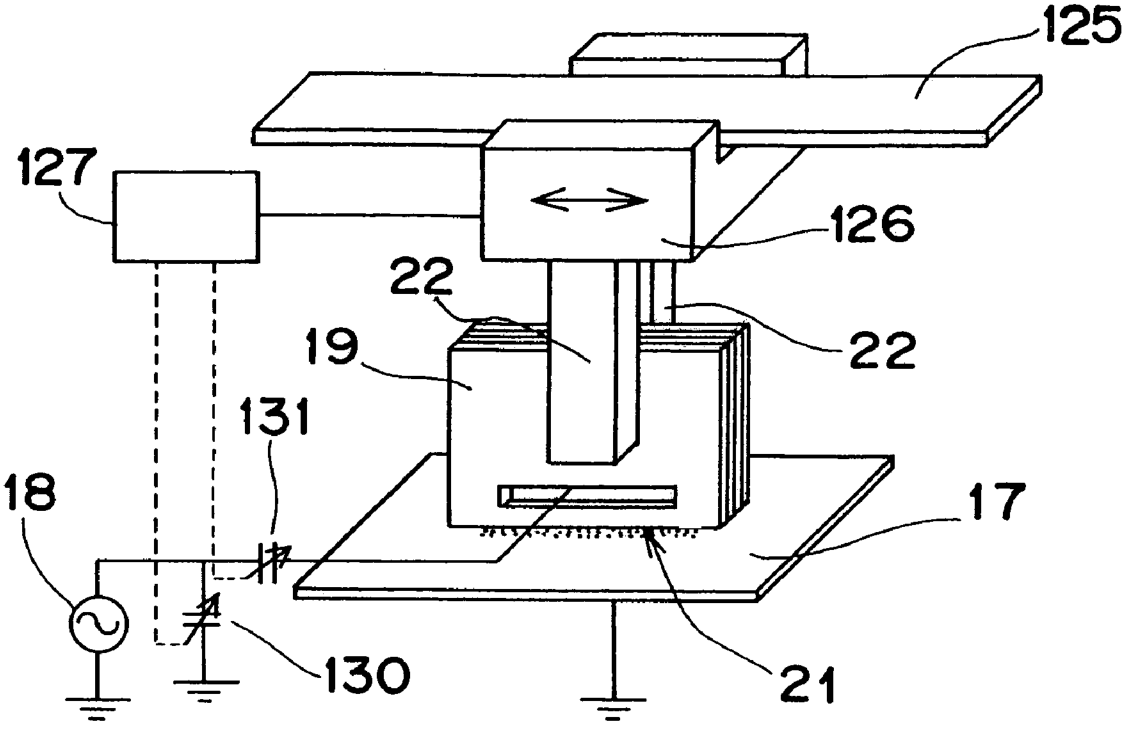
FIG. 31 is a perspective view of the plasma processing apparatus employed in a twentieth embodiment of the present invention.

The plasma processing apparatus and a method therefor according to the twentieth embodiment of the present invention will be described next with reference to FIG. 31. In FIG. 31, a pair of brackets 22 for holding a plasma source 19 are joined to a linear slider 126 meshed with a rail 125. By applying a motion in a direction parallel to the surface of a thin plate 17 to a plasma source 19, a long fine line processing can be effected on the thin plate 17. That is, a mechanism for changing the relative positions of the plasma source 19 and the object to be processed is provided, and a high-frequency power is supplied by a power supply 18 to an electrode via variable capacitors 130 and 131 as one example of the variable reactance element that constitutes a matching circuit. Further, the values of the variable capacitors 130 and 131 are monitored, making it possible to change the amount of control of the linear slider 126 via a control unit 127 on the basis of the result of monitoring the variable capacitor values and perform more accurate position change rate control by feedbacking to the relative position change rate of the plasma source and the object to be processed.

By carrying out the plasma processing in the plasma processing apparatus constructed as above, there can be achieved plasma processing such that the processing line width becomes constant dissimilarly to the prior art method of carrying out the plasma processing at a prescribed position change rate. Moreover, there occurs neither a remaining unprocessed portion nor excessive processing. That is, uniform plasma processing can be achieved. This takes advantage of the fact that the current monitoring value changes in accordance with a change in the state of plasma processing.

Figure 32:
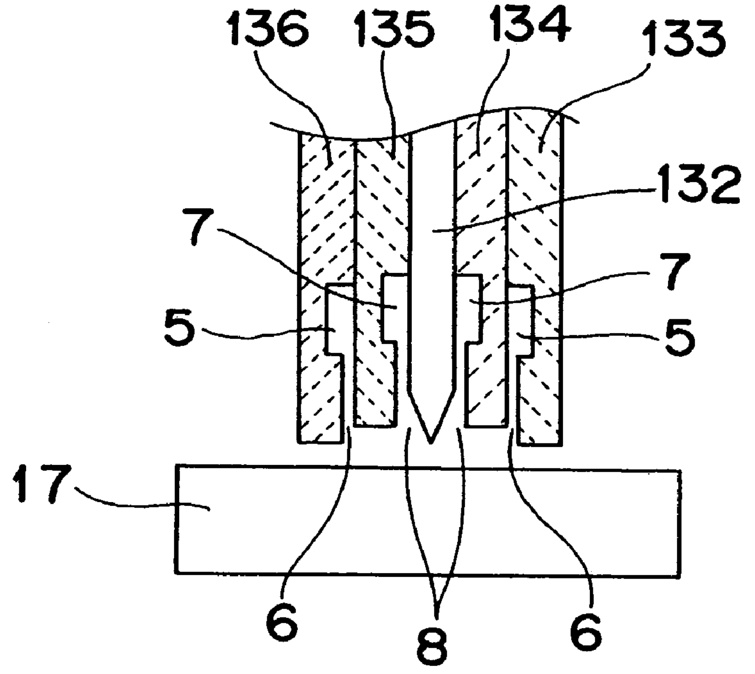
FIG. 32 is a sectional view of the plasma processing apparatus employed in another embodiment of the present invention.

In the fifteenth through twentieth embodiments of the present invention described above, there has been exemplified the case where the four ceramic plates are employed as the plasma source. However, it is possible to employ a variety of plasma sources such as the capillary types of a parallel plate type capillary type, an inductive coupling type capillary type, and so on; a microgap system; and an inductive coupling type tube type. In particular, in the type that employs a knife-edge-shaped electrode 132 as shown in FIG. 32, since the distance between the electrode and the object to be processed is short, a plasma of an extremely high density is formed in the minute portion. Therefore, the present invention is especially effective.

In FIG. 32, the plasma source is formed of an outside plate 133, inside plates 134 and 135, an outside plate 136, which are made of ceramics, and an electrode 132. The outside plates 133 and 136 are provided with an outside gas passage 5 and an outer gas outlet 6, while the inside plates 134 and 135 are provided with an inside gas passage 7 and an inner gas outlet 8. The electrode 132 has a knife-edge-shaped lowermost portion and is able to effect plasma processing in a minute linear region.

Moreover, by supplying a dc voltage or a high-frequency power to the object to be processed, it is also possible to strengthen the action of drawing in the ions in the plasma. In this case, the electrode may be grounded or maintained at a floating potential.

Although there has been exemplified the case of the linear plasma generated by using the high-frequency power, it is possible to generate a linear plasma by using a high-frequency power of a frequency ranging from several hundred kilohertz to several gigahertz. Otherwise, it is possible to use a dc power or supply a pulse power.

Moreover, although it has been exemplified the case where the thickness of the fine line that constitutes the opening of the plasma source is 0.1 mm, the width of the opening of the plasma source is not limited to this. The present invention is also effective for a plasma source of a width of not smaller than 1 mm and also effective for a plasma source of a great width of not smaller than about 100 mm according to circumstances.

Although it has been exemplified the case where the processing is effected in the region on a line of the surface of the object to be processed, the present invention is also effective when processing a dotted region or a planar region.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A plasma processing method for processing a linear portion of an object to be processed by generating a linear plasma by supplying an electric power to an electrode provided at a plasma source or the object while supplying gas to the plasma source arranged in a neighborhood of the object and making activated particles generated by the linear plasma act on the object, the method comprising:

detecting an inclination of the plasma source along a direction of an x-axis when the x-axis is taken in a linear direction of the linear portion of the object; and processing the linear portion of the object with the generated linear plasma by moving the plasma source along the x-axis direction while maintaining relative positions of the plasma source and the object with respect to a distance between the plasma source and the object so that the detected inclination of the plasma source becomes approximately zero.

2. The plasma processing method as claimed in claim 1, wherein when the linear portion of the object is processed, the detecting of the inclination of the plasma source comprises measuring the distance between the plasma source and the object in two different x-coordinate positions to detect the inclination of the plasma source along the x-axis direction, and the processing of the linear portion of the object comprises moving the plasma source along the x-axis direction while maintaining the relative positions of the plasma source and the object so that the distance between the plasma source and the object in the two different x-coordinate positions becomes almost equalized.

3. The plasma processing method as claimed in claim 1, wherein the processing of the linear portion of the object comprises maintaining the relative positions of the plasma source and the object so that light emission intensities of the linear plasma in two different x-coordinate positions become almost equalized while monitoring the light emission intensities of the linear plasma in the two different x-coordinate positions in order to detect the inclination of the plasma source along the x-axis direction.

4. The plasma processing method as claimed in claim 1, wherein the processing of the linear portion of the object is carried out at a pressure within a range of 10000 Pa to three atmospheric pressures.

5. A plasma processing apparatus comprising:

a plasma source that is provided with an electrode, for generating a linear plasma;

a gas supply unit for supplying gas to the plasma source;

a power supply for supplying an electric power to the electrode or an object to be processed;

a detection unit for detecting an inclination of the plasma source along a direction of an x-axis when the x-axis is taken in a linear direction of a linear portion of the object; and a transport unit for moving the plasma source along the x-axis direction while maintaining relative positions of the plasma source and the object with respect to a distance between the plasma source and the object so that the inclination of the plasma source detected by the detection unit becomes almost zero, wherein the plasma source processes the linear portion of the object with the generated linear plasma while the transport unit moves the plasma source along the x-axis direction.

6. The plasma processing apparatus as claimed in claim 5, wherein the detection unit is a length measuring unit for measuring the distance between the plasma source and the object in two different x-coordinate positions, and the transport unit moves the plasma source along the x-axis direction by maintaining the relative positions of the plasma source and the object so that the distance between the plasma source and the object in the two different x-coordinate positions measured by the length measuring unit becomes almost equalized.

7. The plasma processing apparatus as claimed in claim 6, wherein the length measuring unit comprises two laser length measuring units fixed to the plasma source in the two different x-coordinate positions.

8. The plasma processing apparatus as claimed in claim 5, wherein the detection unit comprises two light emission monitors for monitoring light emission intensities of the plasma in the two different x-coordinate positions.

9. The plasma processing apparatus as claimed in claim 8, wherein the light emission monitor is a photodiode.

10. A plasma processing method comprising:

carrying out plasma processing for processing a surface of an object to be processed for a test by generating a linear plasma by supplying an electric power to an electrode provided at a plasma source or the object for a test while supplying gas to the plasma source arranged in a neighborhood of the object for a test with relative positions of the plasma source and the object for a test fixed and making activated particles generated by the linear plasma act on the object for a test;

measuring a processing speed in a processed portion on the surface of the object for a test;

calibrating a length measuring unit for measuring a distance between the plasma source and an object to be processed, which is different from the object for a test and to be subjected to plasma processing, based on a measurement result of the measuring; and carrying out plasma processing for processing a surface of the object to be processed by generating a linear plasma by supplying an electric power to the electrode provided at the plasma source or the object to be processed while supplying gas to the plasma source arranged in a neighborhood of the object to be processed, measuring the distance between the plasma source and the object to be processed and making activated particles generated by the linear plasma act on the object to be processed.

11. A plasma processing method comprising:

processing a linear portion of an object to be processed for a test by generating a linear plasma by supplying an electric power to an electrode provided at a plasma source or the object for a test while supplying gas to the plasma source arranged in a neighborhood of the object for a test with relative positions of the plasma source and the object for a test fixed and making activated particles generated by the linear plasma act on the object for a test;

measuring a distribution in a linear direction of a processing speed in the processed linear portion of the object for a test;

calibrating a length measuring unit for measuring a distance between the plasma source and an object to be processed, which is different from the object for a test and to be subjected to plasma processing, in two different x-coordinate positions based on a measurement result of the measuring when an x-axis is taken in the linear direction; and carrying out plasma processing for processing the object to be processed by generating a linear plasma by supplying an electric power to the electrode provided at the plasma source or the object to be processed while supplying gas to the plasma source arranged in a neighborhood of the object to be processed, measuring the distance between the plasma source and the object to be processed in the two different x-coordinate positions and making activated particles generated by the linear plasma act on the object to be processed.

12. A plasma processing method comprising:

processing an object to be processed for a test by generating a linear plasma by supplying an electric power to an electrode provided at a plasma source or the object for a test while supplying gas to the plasma source arranged in a neighborhood of the object for a test with relative positions of the plasma source and the object for a test fixed and monitoring a light emission intensity of the linear plasma, and making activated particles generated by the linear plasma act on the object for a test;

calibrating a length measuring unit for measuring a distance between the plasma source and an object to be processed, which is different from the object for a test and to be subjected to plasma processing, based on a result of the monitoring of the light emission intensity in the processing; and carrying out plasma processing for processing the object to be processed by generating a linear plasma by supplying an electric power to the electrode provided at the plasma source or the object to be processed while supplying gas to the plasma source arranged in a neighborhood of the object to be processed, measuring the distance between the plasma source and the object to be processed and making activated particles generated by the linear plasma act on the object to be processed.

13. A plasma processing method comprising:

processing a linear portion of an object to be processed for a test by generating a linear plasma by supplying an electric power to an electrode provided at a plasma source or the object for a test while supplying gas to the plasma source arranged in a neighborhood of the object for a test with relative positions of the plasma source and the object for a test fixed, monitoring light emission intensities of the linear plasma in two different x-coordinate positions when an x-axis is taken in a linear direction and making activated particles generated by the linear plasma act on the object for a test;

calibrating a length measuring unit for measuring a distance between the plasma source located in the two different x-coordinate positions and an object to be processed, which is different from the object for a test and to be subjected to plasma processing, based on a result of the monitoring of the light emission intensities in the processing; and carrying out plasma processing for processing the object to be processed by generating a linear plasma by supplying an electric power to the electrode provided at the plasma source or the object to be processed while supplying gas to the plasma source arranged in a neighborhood of the object to be processed, and measuring the distance between the plasma source located in the two different x-coordinate positions and the object to be processed and making activated particles generated by the linear plasma act on the object to be processed.

14. A plasma processing method for processing a linear portion of an object to be processed by generating a linear plasma by supplying an electric power to an electrode provided at a plasma source or the object while supplying gas to the plasma source arranged in a neighborhood of the object and moving the plasma source in a linear direction with a distance between the object and the plasma source maintained almost constant while making activated particles generated by the linear plasma act on the object, the method comprising processing the linear portion of the object by using a length measuring unit arranged at a position located apart from the plasma source in a direction in which the plasma source moves and moving the plasma source in the linear direction while maintaining the distance between the object and the plasma source almost constant based on a result of measuring the distance between the plasma source and the object measured with the length measuring unit.

15. A plasma processing method for processing a linear portion of an object to be processed by generating a linear plasma by supplying an electric power to an electrode provided at a plasma source or the object while supplying gas to the plasma source arranged in a neighborhood of the object and moving the object in a linear direction with a distance between the object and the plasma source maintained almost constant while making activated particles generated by the linear plasma act on the object, the method comprising processing the linear portion of the object by using a length measuring unit arranged at a position located apart from the plasma source in a direction opposite to a direction in which the object is moved and moving the object in the linear direction while maintaining the distance between the object and the plasma source almost constant based on a result of measuring the distance between the plasma source and the object with the length measuring unit.

16. A plasma processing method for carrying out plasma processing for processing an object to be processed by generating a plasma by supplying an electric power to an electrode provided at a plasma source or the object while supplying gas to the plasma source arranged in a neighborhood of the object and making activated particles generated by the plasma act on a portion of the object while changing relative positions of the plasma source and the object, the method comprising processing the object by feeding back a result of monitoring a light emission intensity of the plasma to a relative position change rate of the plasma source and the object while changing relative positions of the plasma source and the object.

17. A plasma processing method for carrying out plasma processing for processing an object to be processed by generating a plasma by supplying an electric power to an electrode provided at a plasma source or the object while supplying gas to the plasma source arranged in a neighborhood of the object and making activated particles generated by the plasma act on a portion of the object while changing relative positions of the plasma source and the object, the method comprising processing the object by feeding back a result of monitoring the electric power, a voltage, or a current supplied to the electrode or the object to a relative position change rate of the plasma source and the object while changing relative positions of the plasma source and the object.

18. A plasma processing method for processing an object to be processed by generating a plasma by supplying a high-frequency power to an electrode provided at a plasma source or the object via a matching circuit while supplying gas to the plasma source arranged in a neighborhood of the object and making activated particles generated by the plasma act on a portion of the object, the method comprising executing end point detection of the processing of the object by monitoring a value of a variable reactance element in the matching circuit while changing relative positions of the plasma source and the object.

19. A plasma processing method for processing an object to be processed by generating a plasma by supplying a high-frequency power to an electrode provided at a plasma source or the object via a matching circuit while supplying gas to the plasma source arranged in a neighborhood of the object and making activated particles generated by the plasma act on a portion of the object while changing relative positions of the plasma source and the object, the method comprising processing the object by feeding back a result of monitoring a value of a variable reactance element in the matching circuit to a relative position change rate of the plasma source and the object while changing relative positions of the plasma source and the object.

20. A plasma processing apparatus comprising:

a plasma source, which is provided with an electrode, for generating a plasma on a portion of a surface of an object to be processed;

a gas supply unit for supplying gas to the plasma source;

a power supply for supplying an electric power to the electrode or the object;

a mechanism for changing relative positions of the plasma source and the object;

a light emission monitor for monitoring a light emission intensity of the plasma; and a mechanism for feeding back a result of the monitoring of the light emission intensity to a relative position change rate of the plasma source and the object.

21. A plasma processing apparatus comprising:

a plasma source, which is provided with an electrode, for generating a plasma on a portion of a surface of an object to be processed;

a gas supply unit for supplying gas to the plasma source;

a power supply for supplying an electric power to the electrode or the object;

a mechanism for changing relative positions of the plasma source and the object;

a monitor for monitoring the electric power, a voltage, or a current; and a mechanism for feeding back a result of the monitoring of the electric power, the voltage, or the current to a relative position change rate of the plasma source and the object.

22. A plasma processing apparatus comprising:

a plasma source, which is provided with an electrode, for generating a plasma on a portion of a surface of an object to be processed;

a gas supply unit for supplying gas to the plasma source;

a matching circuit having a variable reactive element;

a power supply for supplying a high-frequency power to the electrode or the object via the matching circuit;

a mechanism for monitoring a value of the variable reactance element in the matching circuit; and an end point detector for executing end point detection of the plasma processing based on a result of the monitoring of the value of the variable reactance element, wherein the plasma processing apparatus changes relative positions of the plasma source and the object during processing.

23. A plasma processing apparatus comprising:

a plasma source, which is provided with an electrode, for generating a plasma on a portion of a surface of an object to be processed;

a gas supply unit for supplying gas to the plasma source;

a matching circuit having a variable reactive element;

a power supply for supplying a high-frequency power to the electrode or the object via the matching circuit;

a mechanism for changing relative positions of the plasma source and the object;

a mechanism for monitoring a value of the variable reactance element in the matching circuit; and a mechanism for feeding back a result of the monitoring of the value of the variable reactance element to a relative position change rate of the plasma source and the object.

* * * * *